United States Patent
Ichikawa

(10) Patent No.: US 7,329,300 B2
(45) Date of Patent: Feb. 12, 2008

(54) HONEYCOMB STRUCTURE, METHOD OF MANUFACTURING THE SAME, AND DISCHARGE FLUID PURIFICATION SYSTEM

(75) Inventor: Yukihito Ichikawa, Nagoya (JP)

(73) Assignee: NGK Insulators Ltd, Nagoya (JP)

( * ) Notice: Subject to any disclaimer, the term of this patent is extended or adjusted under 35 U.S.C. 154(b) by 728 days.

(21) Appl. No.: 10/815,795

(22) Filed: Apr. 2, 2004

(65) Prior Publication Data

US 2004/0209039 A1    Oct. 21, 2004

(30) Foreign Application Priority Data

Apr. 21, 2003  (JP)  ............... 2003-115986

(51) Int. Cl.
B01D 46/00    (2006.01)
F01N 3/022    (2006.01)

(52) U.S. Cl. ............ 55/523; 55/282.2; 55/282.3; 55/385.3; 55/524; 55/DIG. 5; 55/DIG. 10; 55/DIG. 30; 60/297; 60/299; 60/311; 428/116; 264/628; 264/630; 264/138

(58) Field of Classification Search ........... 55/282.2, 55/282.3, 385.3, 523, 524, DIG. 5, DIG. 10, 55/DIG. 30; 60/297, 259, 300, 303, 311; 428/116, 117, 118; 502/439; 264/628, 630, 264/138

See application file for complete search history.

(56) References Cited

U.S. PATENT DOCUMENTS

| | | | |
|---|---|---|---|
| 4,338,273 A * | 7/1982 | Schnedecker ............ | 264/167 |
| 4,519,820 A | 5/1985 | Oyobe et al. | |
| 4,781,831 A * | 11/1988 | Goldsmith ............... | 210/247 |
| 6,613,297 B1 * | 9/2003 | Sigling ................... | 422/180 |
| 2002/0076365 A1 | 6/2002 | Hoelzer | |
| 2003/0093982 A1 | 5/2003 | Suwabe et al. | |
| 2004/0018123 A1 * | 1/2004 | Okawara et al. .......... | 422/177 |
| 2004/0131512 A1 | 7/2004 | Abe et al. | |
| 2004/0131772 A1 | 7/2004 | Yamada et al. | |

FOREIGN PATENT DOCUMENTS

| | | | |
|---|---|---|---|
| EP | 1 215 374 A1 * | 6/2002 | |
| EP | 1 293 241 A2 | 3/2003 | |
| EP | 1 371 826 A2 | 12/2003 | |
| EP | 1 415 779 A1 | 5/2004 | |

(Continued)

*Primary Examiner*—Jason M. Greene
(74) *Attorney, Agent, or Firm*—Oliff & Berridge, PLC

(57) ABSTRACT

A honeycomb structure includes partition walls arranged so as to form a plurality of cells extending to an other-end portion from a one-end portion through an axial direction. There are provided a honeycomb structure including a partition wall having a different height in the axial direction in the one-end portion, and a manufacturing method suitable for the structure. There is provided a honeycomb structure comprising: a plurality of partition walls arranged so as to form a plurality of cells extending through an axial direction; and a plugging portion in an open end portion of a predetermined cell. The honeycomb structure includes convex and concave plugging portions, and intersecting portions of surrounding partition walls of one cell which does not any plugging portion contact one or more cells including the convex plugging portions and one or more cells including the concave plugging portions for each intersecting portion. A manufacturing method suitable for this honeycomb structure is also provided. There is provided a discharge fluid purification system including the honeycomb structure.

24 Claims, 21 Drawing Sheets

FOREIGN PATENT DOCUMENTS

| | | |
|---|---|---|
| EP | 1 418 032 A2 | 5/2004 |
| JP | A 57-7217 | 1/1982 |
| JP | A 04-293550 | 10/1992 |
| JP | A 2002-309922 | 10/2002 |
| JP | 2003-24726 * | 1/2003 |
| WO | WO 99/48597 A1 | 9/1999 |
| WO | WO 03/008165 A1 | 1/2003 |

* cited by examiner

CUTTING POSITION

HONEYCOMB STRUCTURE, METHOD OF MANUFACTURING THE SAME, AND DISCHARGE FLUID PURIFICATION SYSTEM

BACKGROUND OF THE INVENTION

1. Field of the Invention

The present invention relates to a honeycomb structure, and a method of manufacturing the honeycomb structure, particularly to a honeycomb structure preferably usable for exhaust gas purification, water treatment, separating films, and the like, a method of manufacturing the honeycomb structure, and a discharge fluid purification system.

2. Description of the Related Art

There has been increasingly a need for removing particulates and toxic materials in an exhaust gas of an internal combustion engine, boiler or the like in consideration of an influence on an environment. Especially, regulations on particulate materials (hereinafter referred to as PM) exhausted from diesel engines have tended to be reinforced in Europe, America, and Japan, and a honeycomb filter in which a honeycomb structure is used in a trapping filter (hereinafter referred to as DPF) for removing the PM has been used. The honeycomb filter in which the honeycomb structure is used has also been used in filtration of liquids such as city water and sewage or in separating films and the like.

When the honeycomb structure is used as the honeycomb filter, for example, as shown in FIGS. 19(a) to (c), the honeycomb structure is used in the form of a honeycomb structure 1 comprising porous partition walls 2 arranged so as to form a plurality of cells 3 extending to an other-end portion 44 from a one-end portion 42 through an axial direction, and plugging portions 4 arranged so as to plug the cells 3 in either end portion. In this form, a fluid to be treated flowing into the cell from the one-end portion 42 are discharged from the other-end portion 44 via another cell 3 through the porous partition wall 2. In this case, the partition wall 2 forms a filter to capture the PM and the like.

However, when the honeycomb structure is used as the DPF or the like, and many deposits such as the PM are accumulated on an open end portion of the cell, there are problems that an inflow area of the open end portion decreases or the open end portions is blocked, a pressure loss of the honeycomb filter increases, and an output drop or deterioration of fuel efficiency of the diesel engine is caused.

Moreover, a honeycomb structure which does not have any plugging portion is also used, for example, in removing soluble organic components (hereinafter referred to as SOF) discharged from the diesel engine, but there are problems that the SOF and the like stick to the open end portion, the inflow area of the open end portion decreases, or the open end portion is blocked to increase the pressure loss. Furthermore, this problem of the blocked opening is caused not only in a case where the exhaust gas from the diesel engine is treated but also in a case where gas or liquid is treated as the fluid to be treated.

In a case where the honeycomb structure including the plugging portion is used for the DPF, as a method of preventing a rapid increase of the pressure loss by deposition of the particulate material, a plugging honeycomb structure has been proposed in which a protruding portion protruding in a shape thinned toward an upstream side from the end portion of the cell is formed in the plugging portion (refer to Japanese Patent Application Laid-Open No. 2002-309922). However, an appropriate manufacturing method capable of providing the honeycomb structure including the plugging portion shaped in this manner as an industrial product has not been described, and there is not any method capable of industrially manufacturing the structure.

Moreover, a structure whose partition walls are deformed/bent and bonded to each other to close a port of the cell passage in a tip of a square cell passage (see Japanese Patent Application Laid-Open No. 57-7217). Even this structure has an effect of inhibiting the blocking, but it is difficult to form a deformed/bent portion. There has been a demand for a structure in which strength of the deformed/bent portion is further enhanced.

SUMMARY OF THE INVENTION

An object of the present invention is to provide a honeycomb structure whose opening is inhibited from being blocked and which is easily manufactured, a method of manufacturing the honeycomb structure, and a discharge fluid purification system in which the honeycomb structure is used.

The present invention first provides a honeycomb structure comprising: partition walls arranged so as to form a plurality of cells extending to an other-end portion from a one-end portion through an axial direction, wherein the partition walls having different heights in the axial direction are arranged in the one-end portion (first aspect).

In the first aspect of the present invention, a plurality of partition walls are arranged substantially in parallel with an X-direction in a section vertical to the axial direction of the honeycomb structure, and the plurality of partition walls preferably include a partition wall disposed in such a manner that the height of the partition wall in the axial direction is different from the heights of adjacent partition walls on opposite sides in the one-end portion. A plurality of partition walls are further arranged substantially in parallel with a Y-direction in a section vertical to the axial direction of the honeycomb structure, and the plurality of partition walls preferably further include a partition wall disposed in such a manner that the height of the partition wall in the axial direction is different from the heights of adjacent partition walls on opposite sides in the one-end portion. Partition walls having different heights in the axial direction are preferably arranged in the other-end portion. A partition wall is preferably disposed including a portion in which a thickness of the partition wall is reduced toward a tip in the end portion.

The present invention secondly provides a honeycomb structure comprising: a plurality of partition walls arranged substantially in parallel with an X-direction and a plurality of partition walls arranged substantially in parallel with a Y-direction so as to form a plurality of cells extending to an other-end portion from a one-end portion through an axial direction; and plugging portions for plugging open end portions of predetermined cells among the plurality of cells in either end portion, wherein the plugging portions in the one-end portion include a convex plugging portion including a protruding portion protruding from any of surrounding partition walls in the axial direction, and a concave plugging portion dented from the convex plugging portion in the axial direction, and intersecting portions of surrounding partition walls of one cell which does not include any plugging portion contact one or more cells including the convex plugging portions and one or more cells including the concave plugging portion for each intersecting portion in the one-end portion (second aspect of the invention).

In the second aspect of the invention, the plugging portion preferably comprises a protruding portion protruding from any of the surrounding partition walls in the axial direction, and the protruding portion of the convex plugging portion preferably includes a portion whose width is reduced toward a tip from a cell side. A catalyst component is preferably carried by the surface of the plugging portion, and the plugging portion preferably includes a convex plugging portion including a protruding portion protruding from any of the surrounding partition walls in the axial direction, and a concave plugging portion dented from the convex plugging portion in the axial direction in the other-end portion. Any of the surrounding partition walls of one cell which does not include any plugging portion preferably includes a portion whose thickness of the partition wall is reduced toward a tip so as to enlarge an opening of the cell in the one-end portion, and the convex plugging portion is further preferably disposed in contact with the portion of the partition wall whose thickness is reduced toward the tip.

In the honeycomb structure of the first and second aspects, the partition wall also preferably includes pores and is porous, and the surface of the partition wall and/or the pore surface inside the partition wall carries a catalyst component.

The present invention thirdly provides a method of manufacturing a honeycomb structure, comprising: a step of processing/removing a partition wall along a longitudinal direction of the partition wall in a one-end portion of a honeycomb body comprising partition walls arranged so as to form a plurality of cells extending to an other-end portion from the one-end portion through an axial direction (third aspect of the invention).

In the third aspect of the invention, the honeycomb body comprises a plurality of partition walls arranged substantially in parallel with an X-direction in a section vertical to the axial direction, and a cutting step of processing/removing the plurality of partition walls every other partition wall along the longitudinal direction of the partition wall in the one-end portion of the honeycomb body is preferably included. The honeycomb body further comprises the partition walls arranged substantially in parallel with a Y-direction in a section vertical to the axial direction, and a step of processing/removing the plurality of partition walls every other partition wall along the longitudinal direction of the partition wall in the one-end portion of the honeycomb body is further preferably included.

A step of processing/removing the partition walls along the longitudinal direction of the partition wall in the other-end portion is preferably included. As the processing/removing method, a grinding/processing method in which a grindstone is used, and a cutting/processing method in which an end mill or bite or the like is used are preferable, but the present invention is not especially limited to these methods. Examples of the processing method may include an ultrasonic processing, beam processing by laser light and the like.

The present invention fourthly provides a method of manufacturing a honeycomb structure comprising: a cutting step of cutting two adjacent partition walls among a plurality of partition walls arranged substantially in parallel with an X-direction and a plugging portion between the partition walls along a longitudinal direction of the partition wall in a one-end portion of a honeycomb body comprising the plurality of partition walls arranged substantially in parallel with the X-direction and a plurality of partition walls arranged substantially in parallel with a Y-direction so as to form a plurality of cells extending to an other-end portion from a one-end portion through an axial direction, and plugging portions for plugging open end portions of predetermined cells among the plurality of cells in either end portion (fourth aspect of the invention).

The fourth aspect of the invention preferably includes a cutting step of cutting two adjacent partition walls among the plurality of partition walls arranged substantially in parallel with the Y-direction and the plugging portion between the partition walls along the longitudinal direction of the partition wall in the one-end portion of the honeycomb body. In the cutting step, the honeycomb body is also preferably cut broader on an end portion side than on an inner side of the axial direction of the honeycomb body. The method also preferably includes a cutting step of cutting two adjacent partition walls among the plurality of partition walls arranged substantially in parallel with the X or Y-direction and the plugging portion between the partition walls along the longitudinal direction of the partition wall in the other-end portion.

In the manufacturing method of the third and fourth aspects, the honeycomb body is preferably a fired body, or the honeycomb body is also preferably a non-fired body, and a firing step is performed after the cutting step.

The present invention fifthly provides a discharge fluid purification system comprising: a purification section for purifying a discharge fluid; and an introductory section for introducing the discharge fluid into the purification section, wherein the purification section comprises the honeycomb structure of the first and/or second aspect, and a one-end portion of the honeycomb structure is disposed on an upstream side (fifth aspect).

DESCRIPTION OF THE PREFERRED EMBODIMENT

A honeycomb structure, a method of manufacturing the honeycomb structure, and a discharge fluid purification system in which the honeycomb structure is used according to the present invention will be described hereinafter in detail based on a concrete embodiment, but the present invention is not limited to the following embodiment.

Figure 1A:
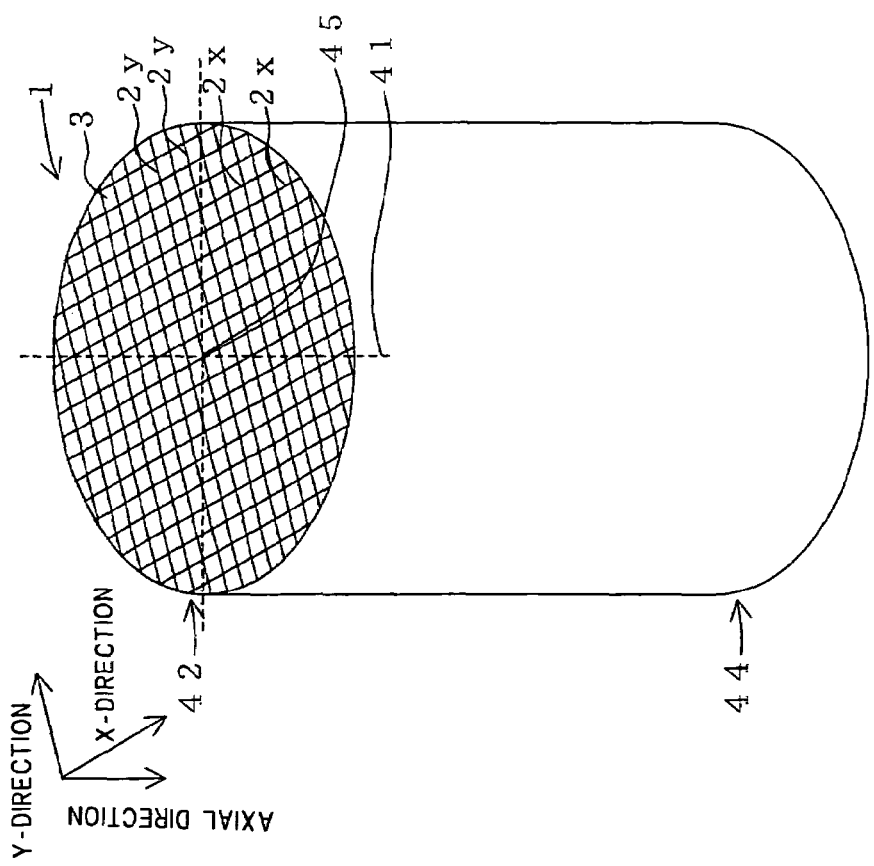
FIG. 1(a) is a schematic perspective view showing one mode of a honeycomb structure according to a first aspect of the present invention, (b) is a schematically partial enlarged view of an axis-Y section showing one mode of the honeycomb structure according to the first aspect of the present invention.
Figure 1B:
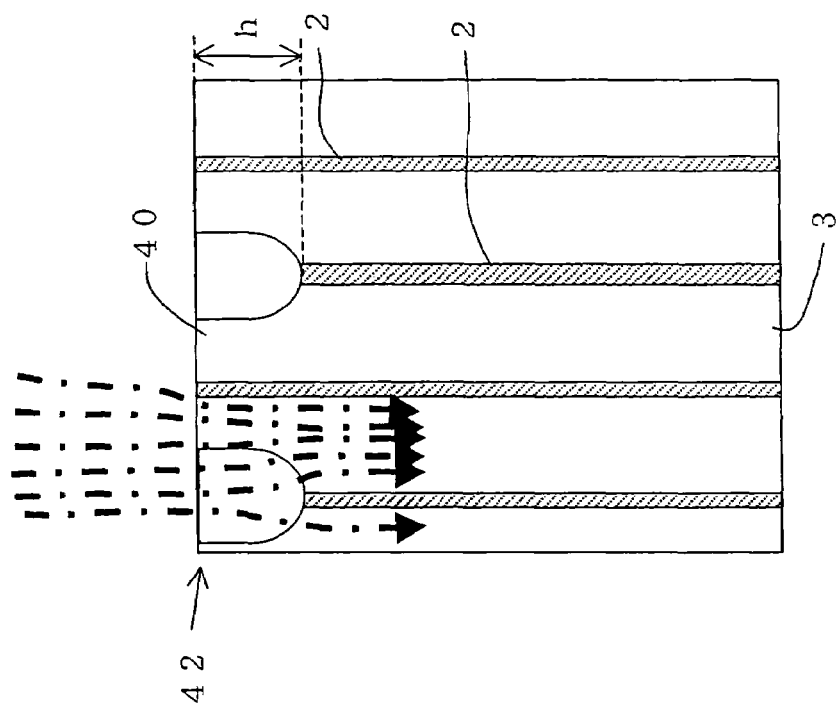
Figure 20A:
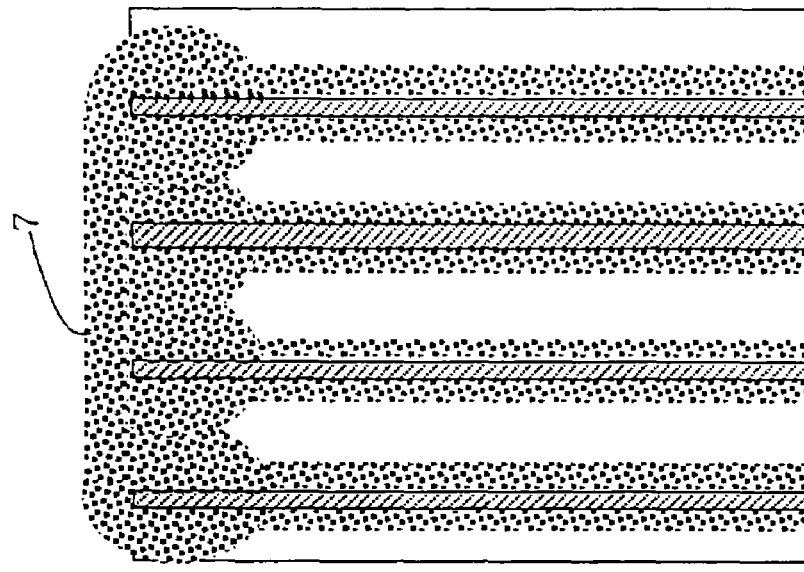
FIGS. 20(a), (b) are explanatory views showing a process in which the particulate material is deposited on the conventional honeycomb structure.
Figure 20B:
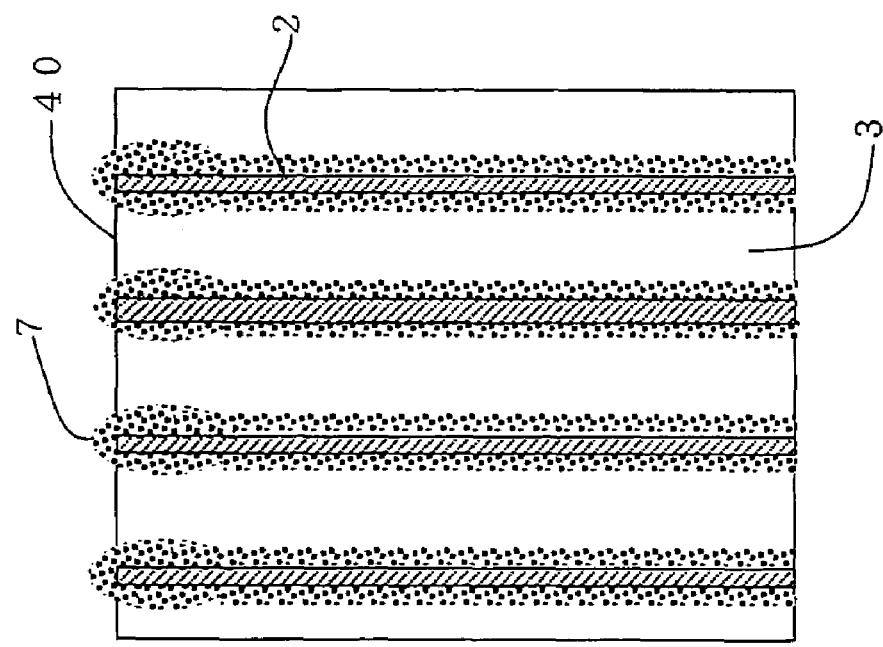

First, the concrete embodiment of the honeycomb structure of a first aspect will be described. As shown in FIGS. 1(a), (b), a honeycomb structure 1 of the first aspect includes partition walls 2 arranged so as to form a plurality of cells extending to an other-end portion 44 from a one-end portion 42 through an axial direction. For important characteristics in the first aspect, the one-end portion 42 includes the partition walls 2 having different heights in the axial direction. As shown in FIGS. 20(a), (b), the heights of the partition walls 2 in the axial direction have heretofore been equal. Therefore, when a fluid to be treated flows into the cell 3, an SOF 7 and the like are easily deposited in an inlet portion of the cell 3, that is, an open end portion 40. By bridging of deposits, as shown in FIG. 20(b), the open end portion 40 is sometimes blocked. However, as shown in FIG. 1(b), since the partition walls 2 having the different heights exist in the open end portion 40, the fluid to be treated in the open end portion 40 smoothly flows, and the deposition of the SOF and the like is reduced. Furthermore, stepped portions are formed in the partition walls surrounding the open end portion. Therefore, even when the SOF and the like are deposited, the blocking by the bridging of the deposits does not easily occur. Furthermore, since the structure can be manufactured by simple steps in a manufacturing method of a third aspect described later, the structure can be manufactured at a low cost, and is easily mass-produced. Since the end portion of the partition wall does not have to be deformed/bent, a satisfactory strength can be maintained.

Furthermore, a crack by a thermal shock in the end portion can be inhibited from being developed. The crack by the thermal shock is easily generated in or near a partition wall intersecting portion in or near the end portion, and the crack is easily developed so as to connect the intersecting portion to another intersecting portion. Therefore, when the partition walls having different heights in the axial direction are arranged in the end portion, the intersecting portions of the partition walls having the different heights in the end portion exist, and therefore the crack by stress concentration in the same plane can be inhibited from being developed. This phenomenon is also seen an inlet end portion directly influenced by heat of exhaust gas in a three-way catalyst or an oxidation catalyst in which the honeycomb structure is used, and therefore the honeycomb structure of the first aspect is useful also in an application of this catalyst structure. Even when the partition wall exists in a part of the honeycomb structure, the effect of the present invention can be obtained, but 5% or more, further 10% or more, especially 20% or more of the partition walls are preferably arranged in this relation. For the honeycomb structure including square cells, the thermal shock crack is easily generated in or in the vicinity of the partition wall intersecting portion in a diagonal direction or the cell, and the crack is easily developed so as to connect the intersecting portion to the other intersecting portion. Therefore, when the crack is developed so as to pass in the vicinity of a section middle portion of the honeycomb structure, and crosses the honeycomb structure section, the honeycomb structure is entirely destroyed. Therefore, in order to prevent the crack from being developed to cross the section of the honeycomb structure, the partition walls having the different heights in the axial direction in the end portion may appropriately be arranged in a region (the corresponding region can be determined by observation of a region where the crack is actually developed) which passes through a center point 41 of X and Y-axes (i.e., center of the honeycomb structure in the figure) and which centers on two lines 45 (lines of Y=X and Y=−X) in a 45° direction with respect to a longitudinal direction of the partition wall.

In the first aspect, as shown in FIGS. 1(a), (b), a plurality of partition walls 2x substantially parallel to at least an X-direction are arranged, the partition walls 2x include the partition walls different in the height of the axial direction in the one-end portion 42, and the partition wall is disposed in such a manner that the partition wall is different in height from the adjacent partition walls on opposite sides, that is, the partition walls formed the cell 3 on the opposite sides have different heights. This is preferable because the open end portion can be more effectively inhibited from being blocked. Even when the partition wall exists in a part of the honeycomb structure, the effect of the present invention can be obtained, but 20% or more, further 40% or more, especially 80% or more of the partition walls substantially parallel to the X-direction are preferably arranged in this relation. It is to be noted that in the present invention, the substantially parallel partition walls mean the partition walls juxtaposed to such an extent that the walls do not intersect with one another in the honeycomb structure.

Further in the first aspect, a plurality of partition walls 2y substantially parallel to the Y-direction are disposed, the partition walls 2y include the partition walls having the different heights in the axial direction in the one-end portion 42, the partition wall is disposed so as to be different in height from the adjacent partition walls on the opposite sides, and this is preferable because the open end portion can be more effectively inhibited from being blocked. Even when the partition wall exists in a part of the honeycomb structure, the effect of the present invention can be obtained, but 20% or more, further 40% or more, especially 80% or more of the partition walls substantially parallel to the Y-direction are preferably arranged in this relation. It is to be noted that in the present embodiment, the Y-direction means a direction crossing the X-direction in a surface vertical to the axial direction of the honeycomb structure. For example, there is one Y-direction in the square cell shown in FIG. 1, two Y-directions Y1, Y2 exist in a triangular cell shown in FIG. 13, and the Y-direction may include a plurality of directions.

Figure 2:
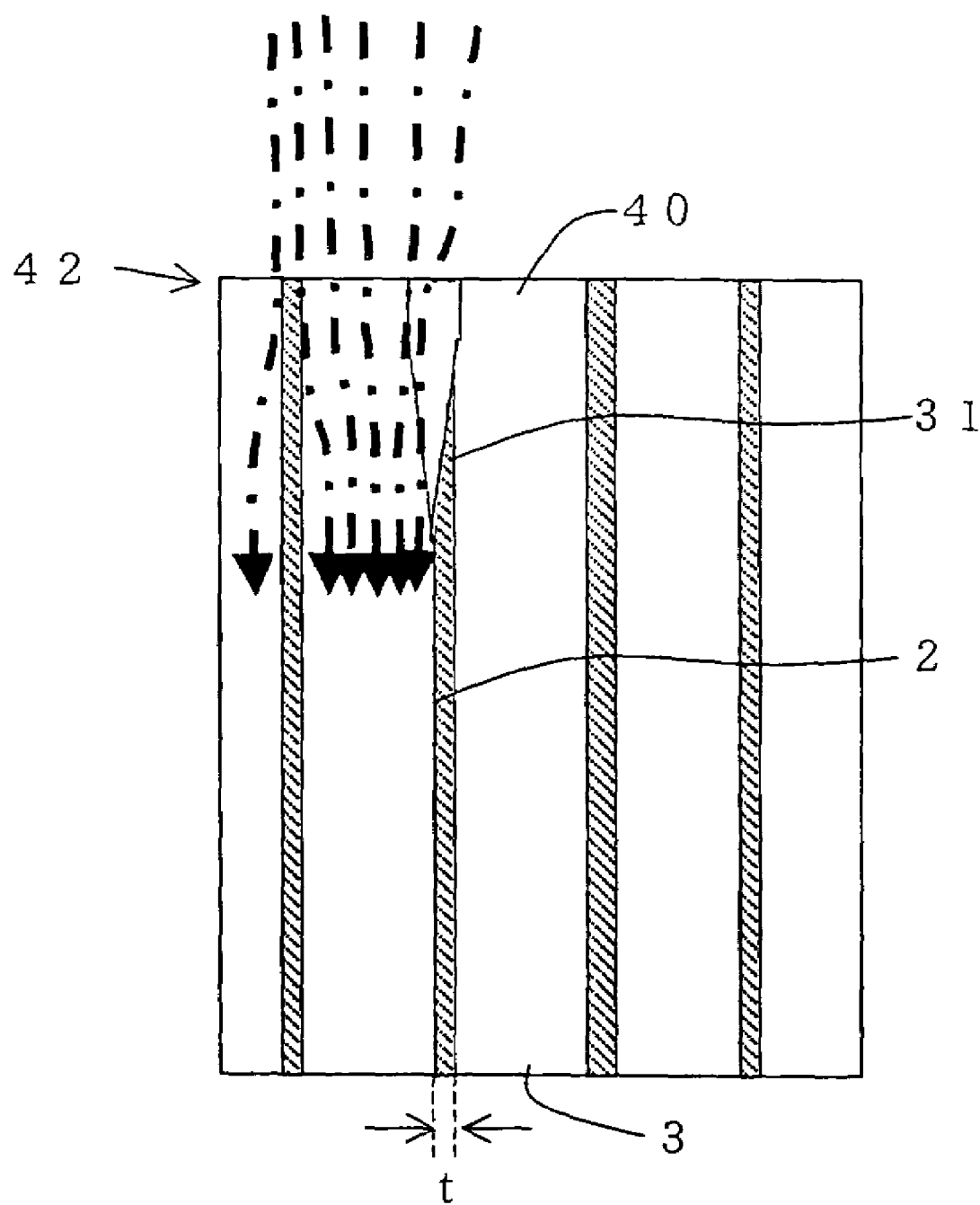
FIG. 2 is a partial enlarged view of the axis-Y section showing another mode of the honeycomb structure according to the first aspect of the present invention.

In the first aspect, as shown in FIG. 2, a partition wall including a portion 31 in which a thickness t of the partition wall 2 is reduced toward a tip is preferably disposed in order to further smoothen a flow of fluid to be treated. From this viewpoint, the partition wall preferably includes a portion thinned toward the tip in the one-end portion, and the partition wall further preferably includes a portion thinned toward the tip in the other-end portion.

In the honeycomb structure of the first aspect, it is also preferable to dispose the partition wall having the different height in the other-end portion in that the crack by the thermal shock is inhibited from being developed and the flow of the fluid to be treated is smoothed.

There is not any special restriction as to a difference of the height of the partition wall in the first aspect. However, when the difference is excessively small, the effect of the present invention is unfavorably excessively small. When the difference is excessively large, an effective area of the partition wall with respect to a volume in which the honeycomb structure is disposed is excessively small, and this is unfavorable. A difference h between the heights of the partition walls is preferably 0.5 to 30 mm, further preferably 1 to 20 mm, especially preferably 3 to 15 mm.

Figure 3A:
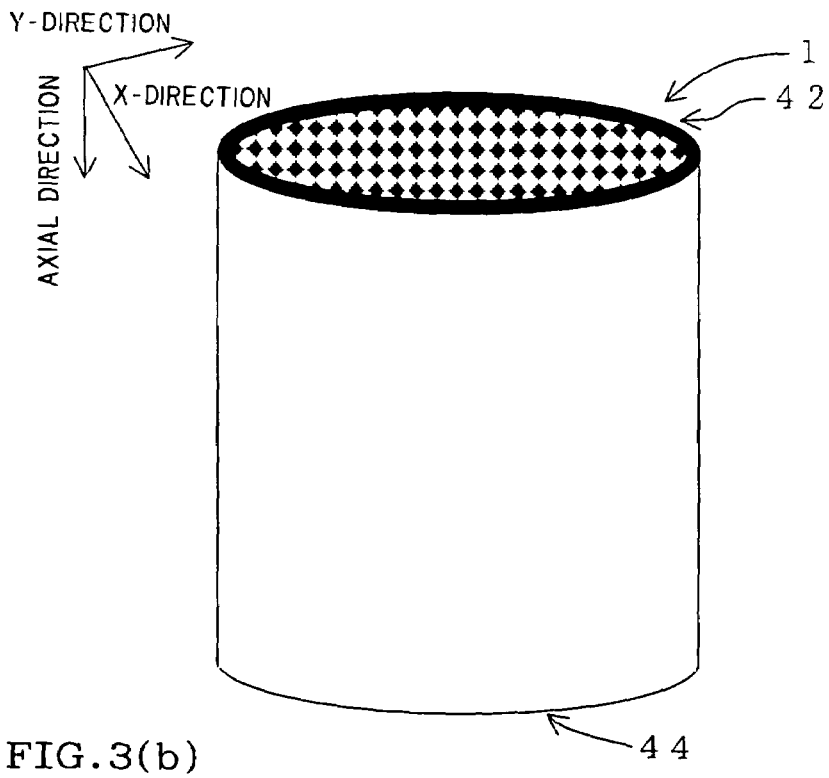
FIG. 3(a) is a schematic perspective view showing one mode of the honeycomb structure according to a second aspect of the present invention, (b) is a schematic plane partial enlarged view of one mode of the honeycomb structure according to the first aspect of the present invention.

Next, the concrete embodiment of the honeycomb structure of a second aspect will be described. As shown in FIGS. 3(a), (b) and 4(a), (b), the honeycomb structure 1 of the second aspect includes a plurality of partition walls 2x arranged substantially in parallel with the X-direction and a plurality of partition walls 2y arranged substantially in parallel with the Y-direction so as to form the plurality of cells 3 extending to the other-end portion 44 from the one-end portion 42 through the axial direction, and plugging portions 4 for plugging the open end portion of the predetermined cell among the plurality of cells 3 in either end portion. For important characteristics of the second aspect, in the one-end portion 42, the plugging portions 4 include a convex plugging portion 4a including a protruding portion 5 protruding from any of the surrounding partition walls 2x, 2y, for example, 2x in the axial direction, and a concave plugging portion 4b dented from the convex plugging portion 4a in the axial direction. Intersecting portions 6a, 6b, 6c, 6d of surrounding partition walls of one cell 3c which does not include any plugging portion contact one or more cells 3a including the convex plugging portions 4a and one or more cells 3b including the concave plugging portion 4b for each intersecting portion.

Figure 3B:
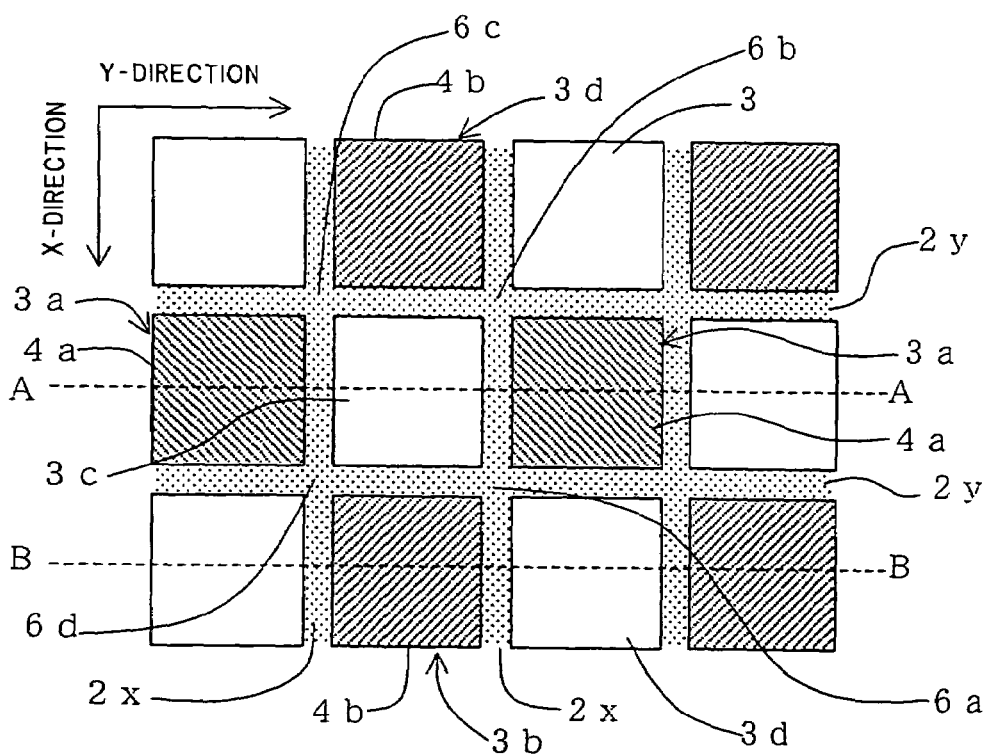
Figure 4A:
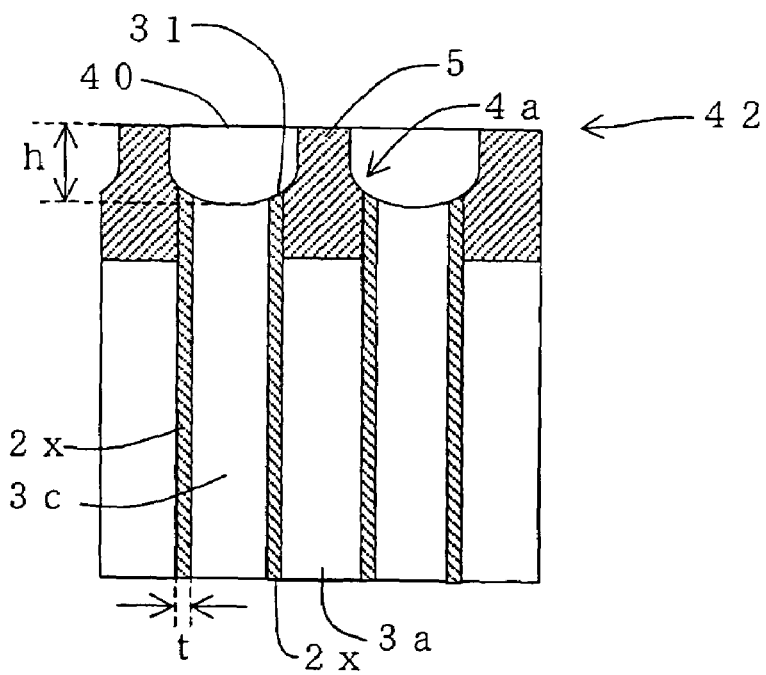
FIG. 4(a) is a partial enlarged view of an A-A section in FIG. 3(b)
Figure 4B:
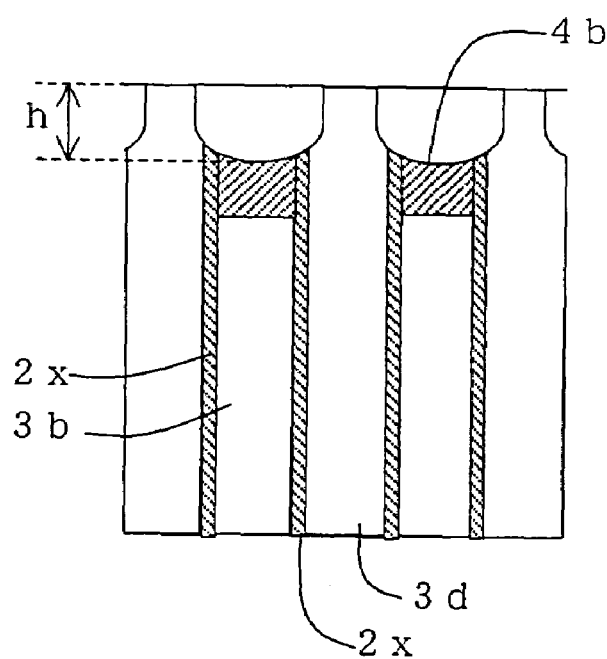
FIG. 4(b) is a partial enlarged view of a B-B section in FIG. 3(b)
Figure 21A:
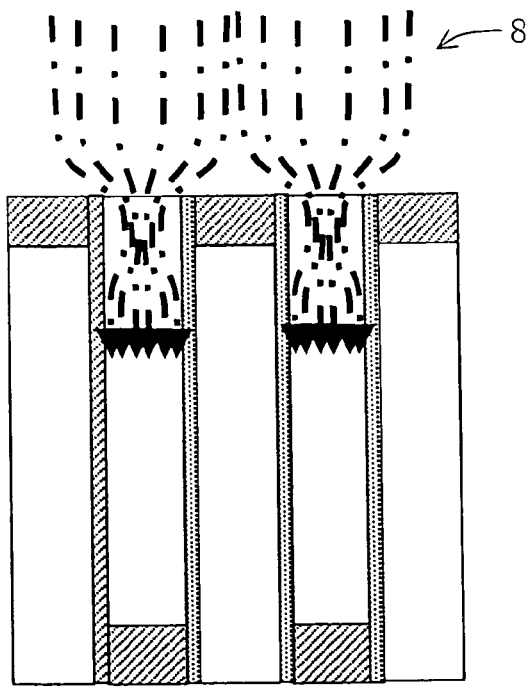
FIGS. 21(a) to (c) are explanatory views showing a process in which the particulate material flows in and is deposited on the conventional honeycomb structure.
Figure 21B:
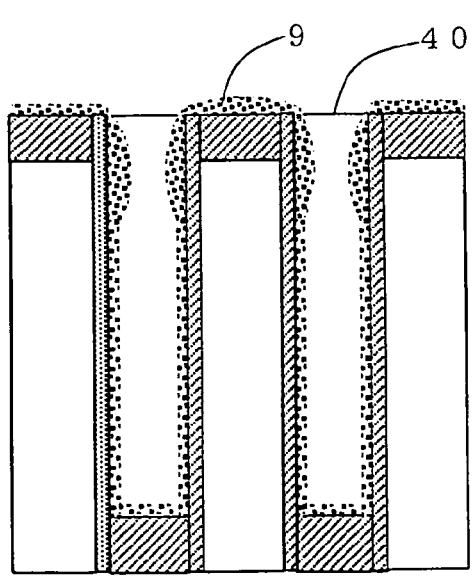
Figure 21C:
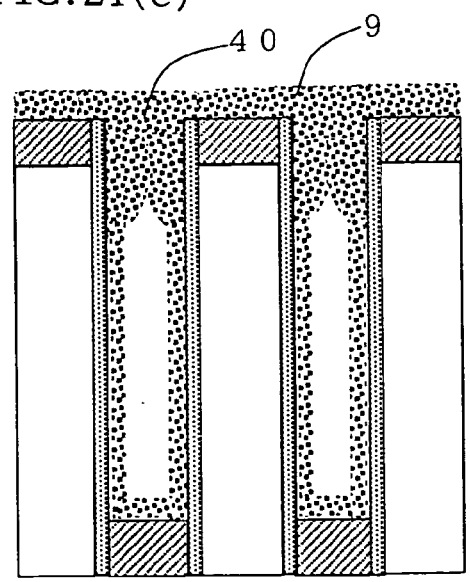

When the conventional honeycomb structure including the plugging portion is used as a filter such as DPF, as shown in FIG. 21(a), stagnation of flow of a fluid to be treated 8 occurs in the vicinity of the open end portion. As shown in FIG. 21(b), a PM 9 and the like are deposited in the vicinity of the open end portion 40, and as shown in FIG. 21(c), the open end portion 40 is sometimes blocked by the bridging of the PM and the like. In the honeycomb structure of the second aspect, as shown in FIG. 3(b), since four plugging portions surrounding a cell 3c opened in the one-end portion include the convex plugging portion 4a and concave plugging portion 4b having the different heights, the blocking by the bridging in the open end portion does not easily occur. As shown in FIG. 4(a), since the protruding portion 5 protruding from the partition walls 2 is disposed, the width of the open end portion 40 is larger than that of the conventional open end portion 40 shown in FIGS. 21(a) to (c), the flow of the fluid to be treated in the open end portion is smoothed, the PM and the like are inhibited from being attached, and further the blocking is not easily caused. Especially, the deposition of the PM and the like is caused from the intersecting portion of the partition walls, which is a base point in many cases. When the height of the intersecting portion is smaller than that of the protruding portion, the intersecting portion does not easily form the base point of the PM deposition, and a volume of the PM is reduced. Furthermore, since the structure can be manufactured by the simple steps in the manufacturing method of a fourth aspect described later, the structure can be manufactured at the low cost, and is easily mass-produced. Since the end portion of the partition wall does not have to be deformed/bent, the satisfactory strength can be maintained.

Moreover, in the honeycomb structure of the second aspect, a thermal stress in the end portion can be distributed, and the crack can be inhibited from being generated or developed by concentration of the thermal stress. In the honeycomb structure including the plugging portion, the cell including the plugging portion is higher in rigidity than the cell which has not any plugging portion, and the thermal stress is easily concentrated on the intersecting portion of the partition walls from this difference of rigidity. However, when the convex and concave plugging portions are disposed, the stress concentration is inhibited from being caused on the same plane, and the stress can be distributed. Moreover, the protruding portion including a portion around which the partition walls are not disposed, therefore the rigidity drops, and a resistance to the thermal stress is enhanced also in this respect.

Even when the plugging portion exists in a part of the honeycomb structure, the effect of the present invention can be obtained, but 5% or more, further 20% or more, especially 80% or more of the plugging portions in the one-end portion are preferably arranged in this relation. There is not any special restriction as to a difference h of the height between the most protruding portion of the convex plugging portion in the axial direction and the most dented portion of the concave plugging portion in the axial direction shown in FIGS. 4(a), (b). However, when the difference is excessively small, the effect of the present invention is unfavorably excessively small. When the difference is excessively large, the effective area of the partition wall with respect to the volume in which the honeycomb structure is disposed is excessively small, and this is unfavorable. The difference between the heights is preferably 0.5 to 30 mm, further preferably 1 to 20 mm, especially preferably 3 to 15 mm.

Figure 5:
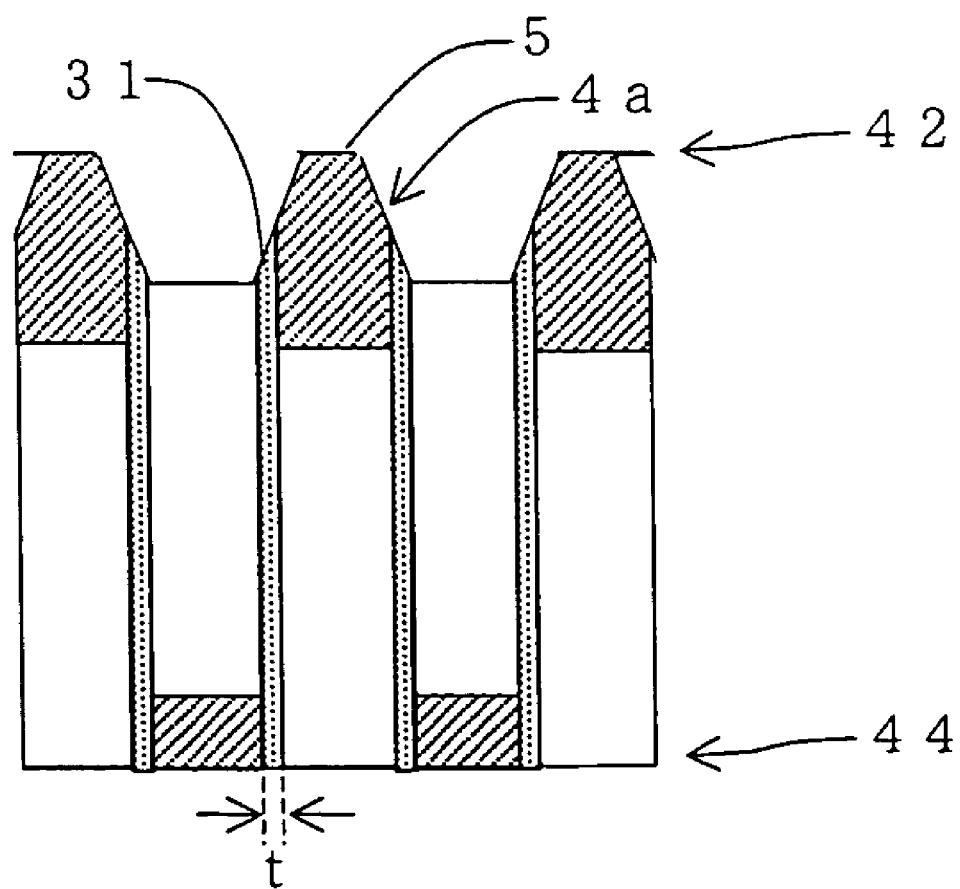
FIG. 5 is a schematic section partial enlarged view showing another mode of the honeycomb structure according to the second aspect of the present invention.
Figure 8A:
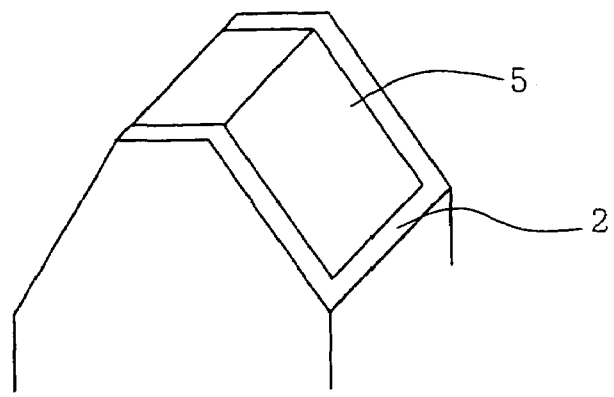
FIGS. 8(a) to (c) are schematic perspective view showing an example of a plugging portion according to the present invention.
Figure 8B:
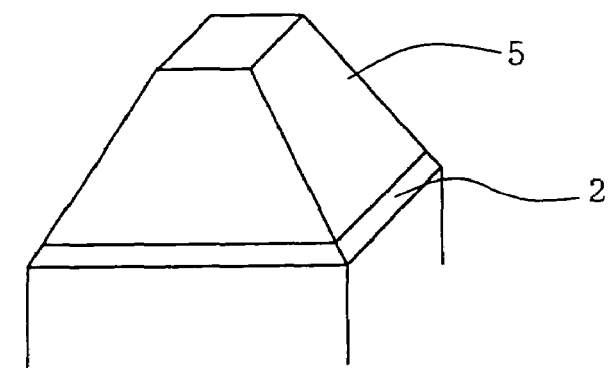

In the second aspect, as shown in FIG. 8(b), the convex plugging portion includes the protruding portion 5 whose height is larger than that of any surrounding partition wall 2 in the axial direction, that is, which protrudes in the axial direction, and this is preferable in that the area of the opening is increased and the opening can be inhibited from being blocked. As shown in FIGS. 4(a) and 5, a portion in which the width of the protruding portion 5 is reduced toward the tip from the cell side, that is, a tapered shape is also preferably included. This is because the fluid to be treated flows into the cell along the shape of the tapered plugging portion, therefore the stagnation of the flow of the fluid to be treated is further inhibited in the cell inlet, an inflow resistance of the exhaust gas decreases, and the blocking is further inhibited. Since the crack by the thermal shock is inhibited from being developed, and the fluid to be treated smoothly flows, it is preferable to dispose the convex and concave plugging portions in the other-end portion.

Figure 6A:
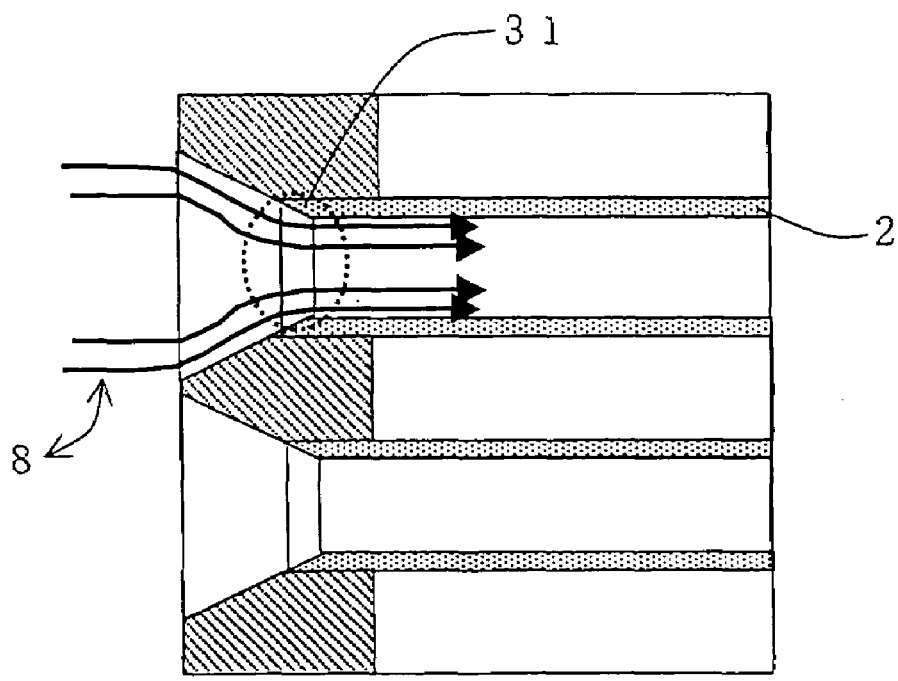
FIGS. 6(a), (b) are explanatory views showing a flow of a fluid to be treated in the honeycomb structure according to the present invention.
Figure 6B:
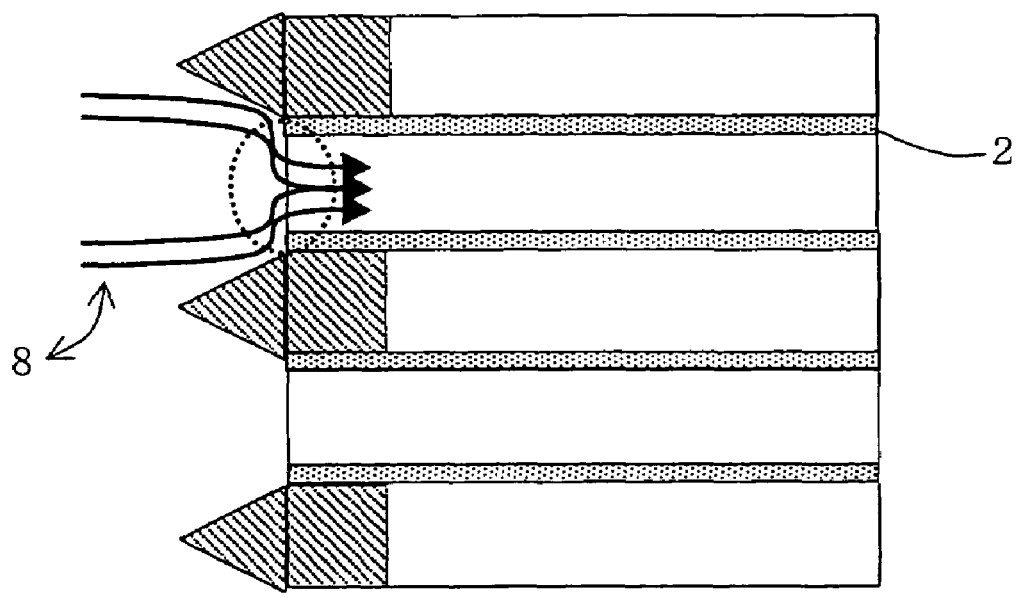

In the honeycomb structure of the second aspect, as shown in FIGS. 4(a) and 5, one cell which does not include any plugging portion in the one-end portion, that is, any of the surrounding partition walls of the cell 3c which is opened in the one-end portion preferably includes the portion 31 in which the thickness t of the partition wall is reduced toward the tip so as to enlarge the opening of the cell 3c. That is, with the mode shown in FIG. 6(a), the fluid to be treated 8 more smoothly flows and the PM and the like are not easily deposited as compared with a mode the partition wall 2 has an equal thickness to its tip as shown in FIG. 6(b). Furthermore, it is preferable to dispose the convex plugging portion 4a in contact with the portion 31 thinned toward the tip from a viewpoint that the flow is smoothed. There is not any special restriction as to the thinned form, and examples include a form thinned in a curve shape as shown in FIG. 4(a), and a form linearly thinned as shown in FIG. 5.

In the honeycomb structure of the first and second aspects, catalysts such as a metal having a catalytic ability are preferably carried. For example, when the structure is used as DPF or in removing SOF, catalysts capable of removing the captured materials, such as a catalyst capable of promoting oxidation/combustion of the PM, are preferable in order to remove the SOF or the PM such as soot captured in the honeycomb structure. Concrete examples of the catalyst include noble metals such as Pt, Pd, and Rh, a non-metallic perovskite catalyst and the like, and at least one type is preferably carried by the honeycomb structure. This catalyst is preferably carried by the surface of the partition wall, but it is also preferable to use a porous partition wall and to carry the catalyst inside pores. In the honeycomb structure of the second aspect, it is also preferable to carry the catalyst on the surface of the plugging portion, that is, the surface exposed to the outside of the honeycomb structure. In this case, the materials such as the PM attached/deposited onto the surface of the plugging portion cause the blocking of the open end portion, and therefore the materials can be removed to inhibit the blocking.

Figure 8C:
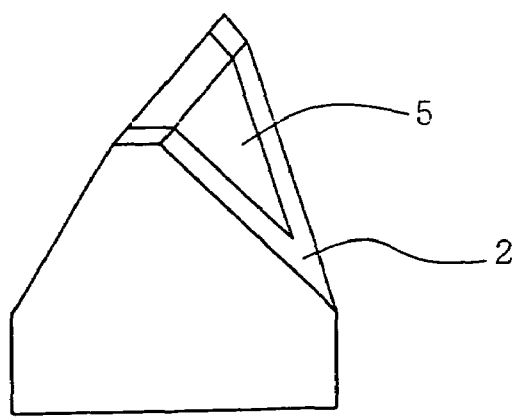

For the honeycomb structure in the present invention, there is not any restriction on the shape. A sectional shape of the honeycomb structure can be appropriately determined, for example, as a circular shape, elliptic shape, race track shape, quadrangular or the like in accordance with application or installation place. There is not any special restriction on the sectional shape of the cell, but a triangular, quadrangular, or hexagonal shape is preferable, and the triangular or quadrangular shape is especially preferable in the second aspect. It is to be noted that in the second aspect, the protruding portion 5 in the convex plugging portion with the quadrangular cell preferably has a shape which includes or does not include the partition walls on the opposite sides as shown in FIGS. 8(a), (b). With the triangular cell, for example, the shape shown in FIG. 8(c) is preferable.

There are not any special restrictions on a cell density, but the cell density may be set, for example, to 6 to 2000 cells/square inch (0.9 to 311 cells/cm$^2$), preferably about 50 to 1000 cells/square inch (7.8 to 155 cells/cm$^2$). There are not any special restrictions on the thickness of the partition wall, but the thickness may be set, for example, to 30 to 2000 μm, preferably 40 to 1000 μm, further preferably about 50 to 750 μm. Moreover, when the plugging portion is disposed, the cells adjacent to each other via the partition wall include the plugging portions in the end portions on the opposite sides, and the plugging portions are preferably arranged so that each end portion has a checkered pattern.

For the honeycomb structure of the present invention, the partition wall is preferably porous. In this case, there are not any special restrictions on a porosity of the partition wall 2. However, for example, when the honeycomb structure 1 is used in the DPF, the porosity is preferably 20% or more, more preferably 40% or more, further preferably 60% or more. The thickness of the partition wall 2 is appropriately reduced, the cell density is decreased, that is, a water power diameter of a cell passage is increased, and the porosity is raised. This is also a preferable mode from a viewpoint of reduction of an initial pressure loss. For example, the thickness of the partition wall 2 is 1.5 mm or less, more preferably 1 mm or less, further preferably 0.5 mm or less. The cell density is 300 cells/square inch or less, more preferably 200 cells/square inch or less, further preferably 100 cells/square inch or less. The porosity is 50% or more, more preferably 60% or more, further preferably 70% or more. On the other hand, when the porosity is excessively large, a strength is excessively insufficient, and therefore the porosity is preferably 90% or more. The thickness of the partition wall 2 is further reduced to lower the porosity, and this is a preferable mode from viewpoints of the reduction of the initial pressure loss while securing a thermal resistance and strength of the partition wall. For example, the thickness of the partition wall 2 is 0.4 mm or less, more preferably 0.3 mm or less, further preferably 0.2 mm or less. The porosity is 60% or less, more preferably 50% or less, further preferably 40% or less.

Furthermore, the honeycomb structure 1 is used as filters which have to reduce the pressure loss, such as a filter in which the catalyst is carried and particulates are continuously burnt. In this case, the porosity is in a range of preferably 30 to 90%, further preferably 50 to 80%, especially preferably 50 to 75%. Moreover, the honeycomb structure is used as a filter in which the catalyst for promoting combustion of the particulate material in the exhaust gas is carried by the partition walls 2. In this case, the structure needs to be formed of a dense material having a high strength so as to bear a larger thermal stress generated at a combustion time of the particulate material. The porosity of this material is preferably 20 to 80%, further preferably 25 to 70%, especially preferably 30 to 60%. For the preferable porosity in a case where there is not any plugging, even when the structure is used in removing the SOF or as an SCR catalyst, the porosity is in a similar range, and preferably high in order to hold the catalyst on the pore surface inside the partition wall and to increase the contact area with the exhaust gas. It is to be noted that the porosity means a volume %.

Moreover, when the honeycomb structure of the second aspect is used in the discharge fluid purification system, the honeycomb structure is stored and used in a can member formed of a metal or the like in many cases. In this case, edge portions of the opposite end portions of the honeycomb structure are sometimes fixed by a fixing member. In this case, the porosity of the protruding portion of the plugging portion is set to be smaller than that of another portion of the plugged honeycomb structure, and the plugging portion is densified. Accordingly, the protruding portion develops a sufficient strength so as to be capable of bearing the contact with the fixing member, and also an effect of smoothing the surface of the protruding portion and reducing friction with the fixing member can be expected. In this case, it is also a preferable mode to reduce the porosity of the whole plugging portion so that the porosity of the protruding portion is set to be smaller than that of the partition wall. In another preferable mode, the porosity of only the protruding portion in the plugging portion is reduced.

There are not any special restrictions on a pore diameter of the partition wall which is a porous member, and the diameter can be appropriately selected by any person skilled in the art in accordance with the application. In general, the pore diameter can be selected in accordance with viscosity of the fluid or an object to be separated. For example, when the honeycomb structure 1 is used in the DPF, the diameter is preferably set to about 1 to 100 μm on average. When the structure is used for purification of water, the diameter is preferably set to about 0.01 to 10 μm. For the preferable pore diameter in a case where there is not any plugging, even when the structure is used in removing the SOF or as the SCR catalyst, the pore diameter is in the similar range, and is preferably large in order to hold the catalyst on the pore surface inside the partition wall and to increase the contact area with the exhaust gas.

Moreover, there are not any special restrictions on the material of the honeycomb structure. From viewpoints of the strength, thermal resistance, durability and the like, main components are preferably various ceramics of oxide or non-oxide, metals and the like. Concretely, examples of the ceramic include cordierite, mullite, alumina, spinel, silicon carbide, silicon nitride, aluminum nitride, zirconia, lithium aluminum silicate, aluminum titanate and the like. Examples of the metal include an Fe—Cr—Al-based metal, metal silicon and the like. One or two or more selected from these are preferable main components. Examples of the preferable material of the partition wall 2 include adsorption materials such as activated carbon, silica gel, and zeolite. Furthermore, from the viewpoints of high strength and thermal resistance, one or two or more selected from a group consisting of alumina, mullite, zirconia, silicon carbide, and silicon nitride is preferable. From the viewpoints of thermal conductivity and thermal resistance, silicon carbide or a silicon-silicon carbide composite material is especially suitable. Here, the "main component" constitutes 50 mass % or more, preferably 70 mass % or more, further preferably 80 mass % of the partition walls 2.

Figure 9B:
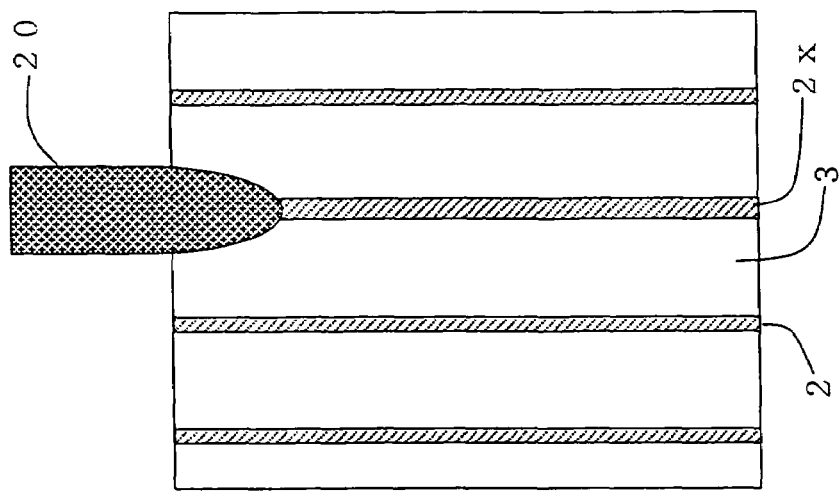
FIGS. 9(a), (b) are explanatory views showing a method of manufacturing the honeycomb structure according to a third aspect of the present invention.
Figure 9A:
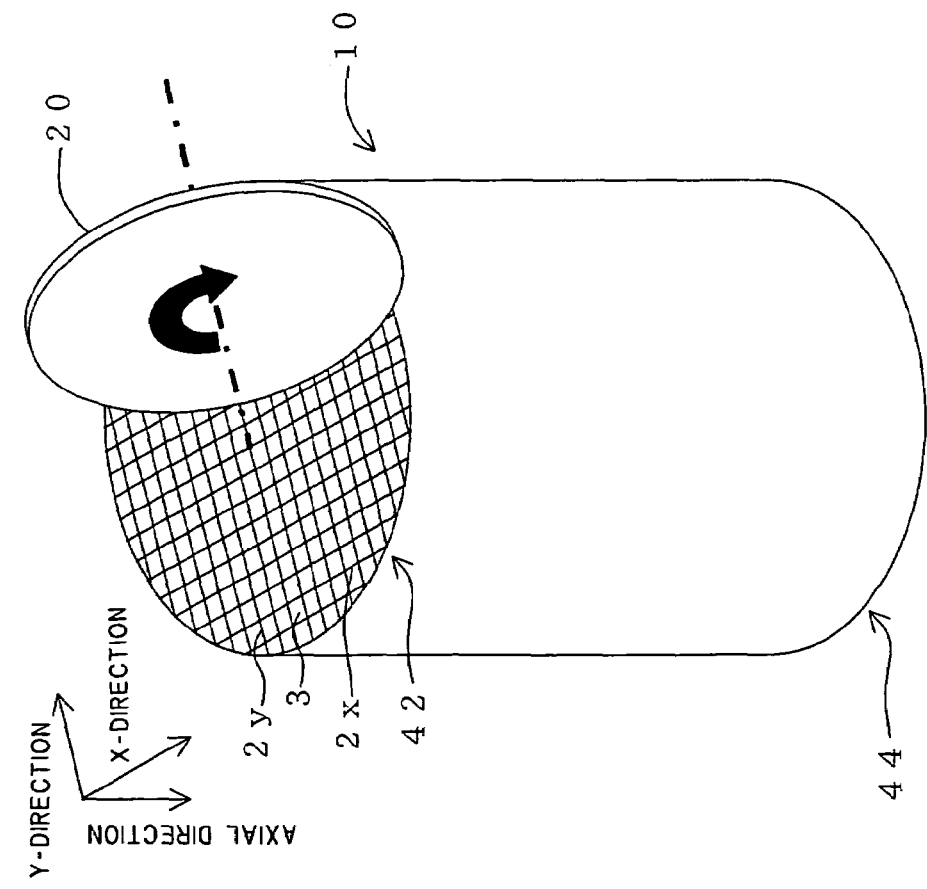
Figure 10:
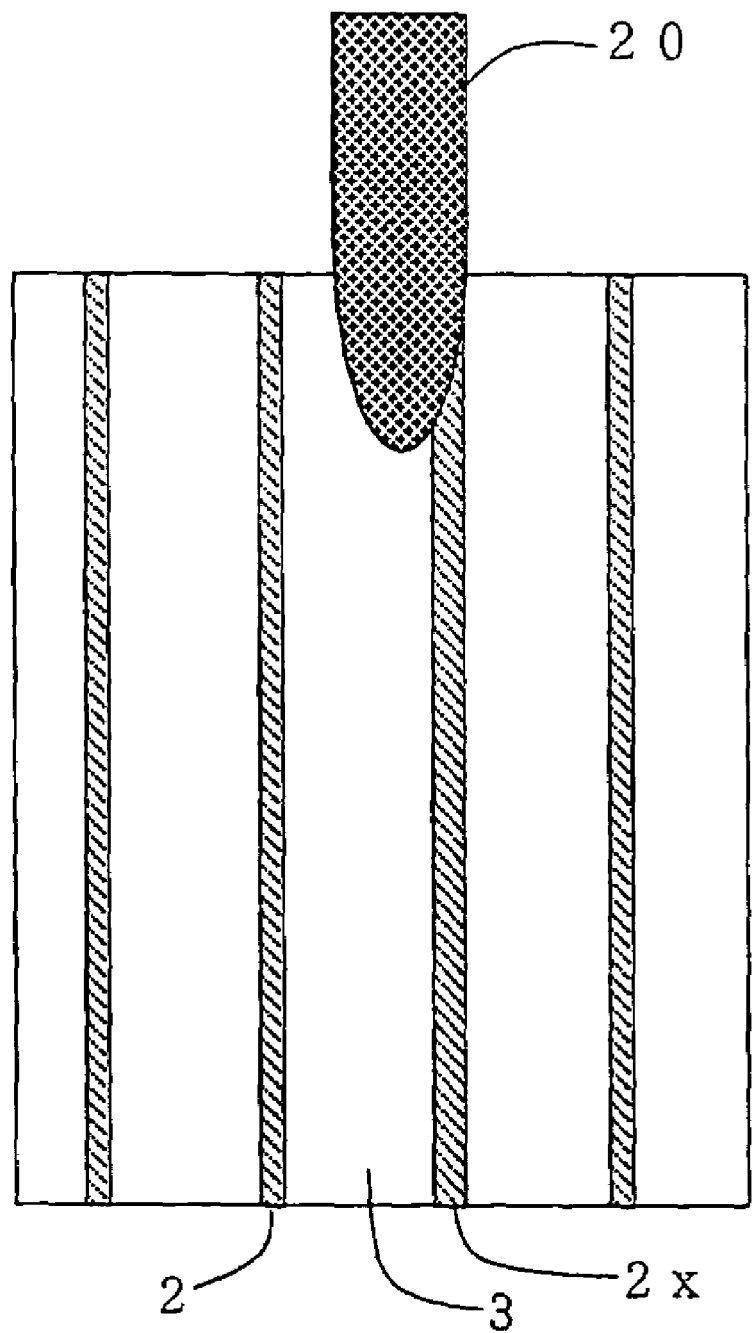
FIG. 10 is an explanatory view showing another example of a method of manufacturing the honeycomb structure according to the third aspect of the present invention.

Next, a concrete example of the manufacturing method of the third aspect will be described. As shown in FIGS. 9(a), (b), the manufacturing method of the third aspect comprises: a step of processing/removing a pressure partition wall $2x$ to a predetermined depth along the longitudinal direction of the partition wall in the one-end portion 42 of the honeycomb body comprising the partition walls $2x$, $2y$ arranged so as to form a plurality of cells 3 extending to the other-end portion 44 from the one-end portion 42. By this step, the honeycomb structure 1 of the first aspect shown in FIG. 1 can be manufactured by a method in which mass production is possible.

There are not any special restrictions on a method of the processing/removing, but the partition wall can be ground, for example, by movement of a grindstone 20 in the longitudinal direction while rotating the grindstone. Furthermore, the end portion of the honeycomb structure is subjected to image processing, and the predetermined partition wall can be processed/removed in accordance with obtained position information of the partition wall. There are not any special restrictions on the depth of the processing/removing, but the processing/removing to a depth corresponding to the predetermined height difference in the first aspect is preferable. It is preferable to process/remove the partition wall in such a manner that the thickness of the partition wall is reduced toward the tip.

In the third aspect, the honeycomb body 10 preferably comprises a plurality of partition walls $2x$ arranged substantially in parallel with the X-direction, and it is preferable to process/remove the plurality of partition walls $2x$ every other partition wall along the longitudinal direction of the partition wall. In this case, the partition wall whose height is different from the heights of the adjacent partition walls on the opposite side can be prepared, and a structure in which the blocking does not easily occur can be realized.

Furthermore, the honeycomb body comprises the plurality of partition walls $2y$ arranged substantially in parallel with the Y-direction, and it is preferable to process/remove the plurality of partition walls $2y$ every other partition wall along the longitudinal direction of the partition wall. Accordingly, the structure in which the blocking does not easily occur can be realized. It is to be noted that the Y-direction is not limited to one direction as described above.

Moreover, the predetermined partition walls are preferably processed/removed along the longitudinal direction of the partition wall in the other-end portion. Accordingly, it is possible to prepare a honeycomb structure which is superior in the resistance to thermal shock and is small in the pressure loss even in the other-end portion. Furthermore, when the honeycomb body includes the partition walls arranged substantially in parallel with the X-direction and/or the Y-direction, it is preferable to process/remove the predetermined partition wall in one or both of the partition walls.

Figure 11A:
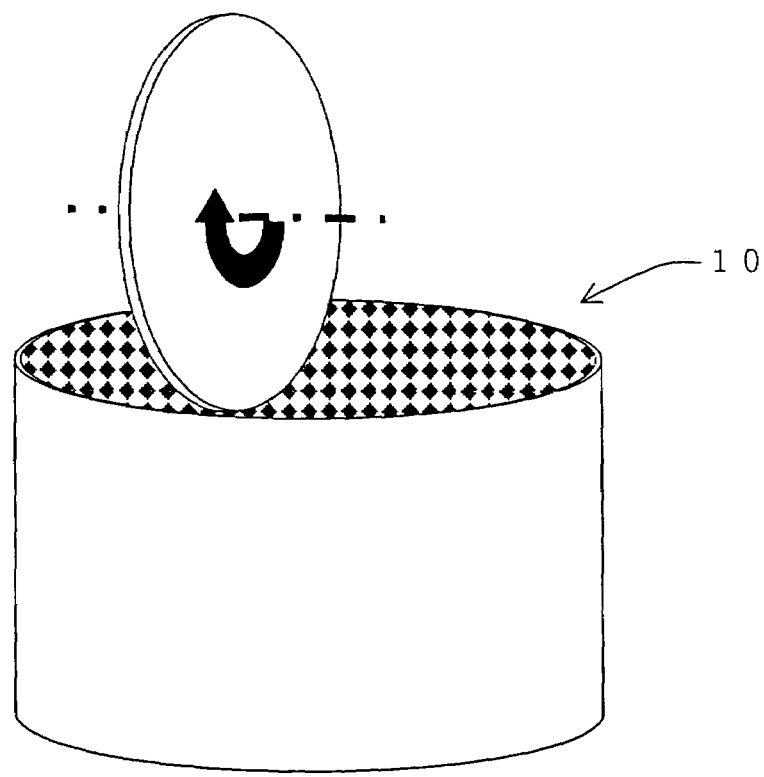
FIGS. 11(a), (b) are explanatory views showing the method of manufacturing the honeycomb structure according to a fourth aspect of the present invention.
Figure 11B:
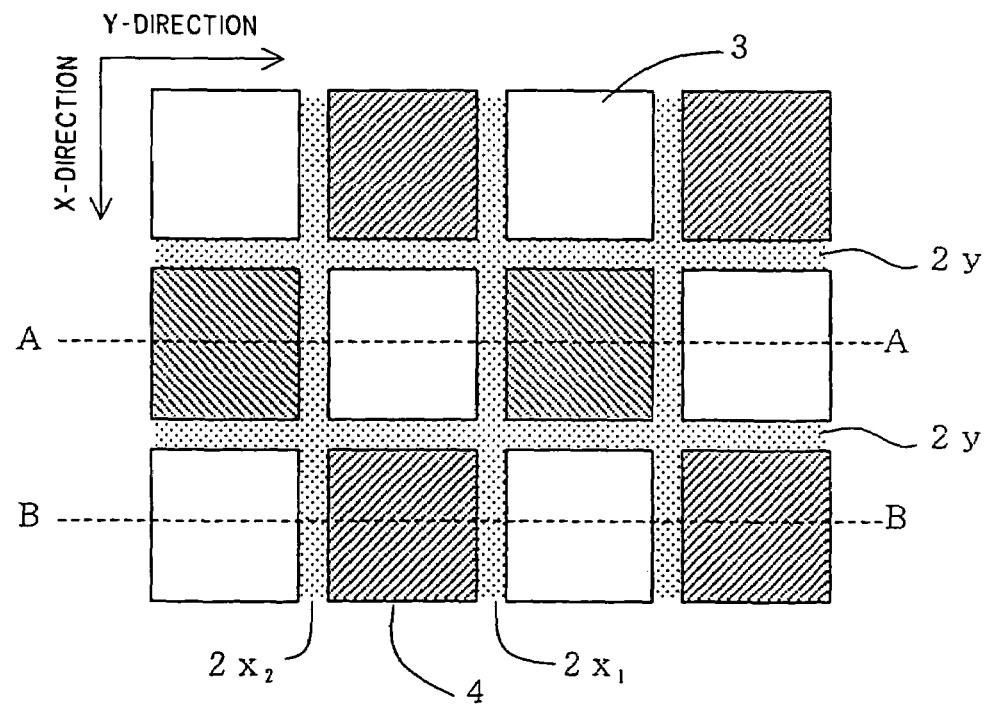
Figure 12B:
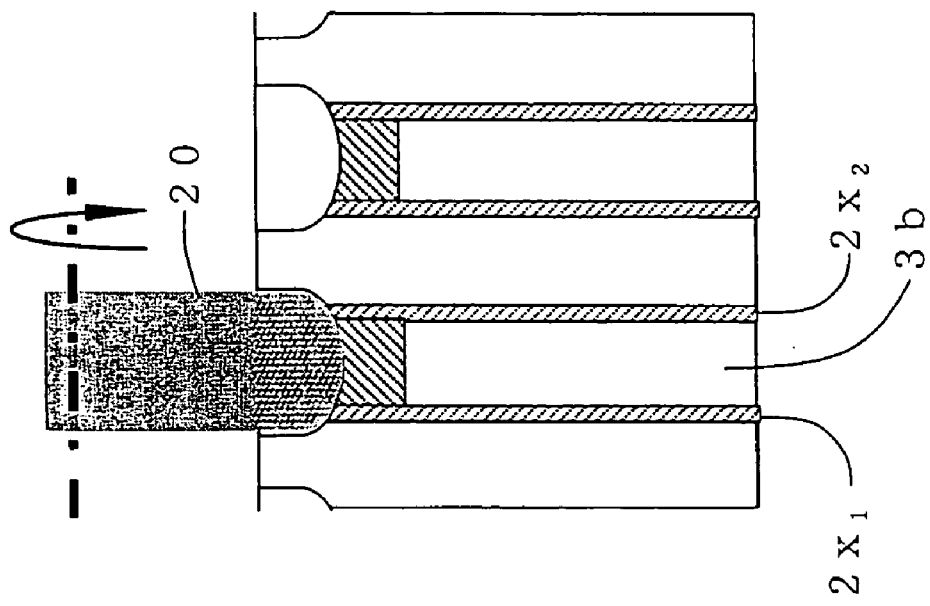
FIG. 12(b) is a partial enlarged view of a B-B section of FIG. 11(b)
Figure 12A:
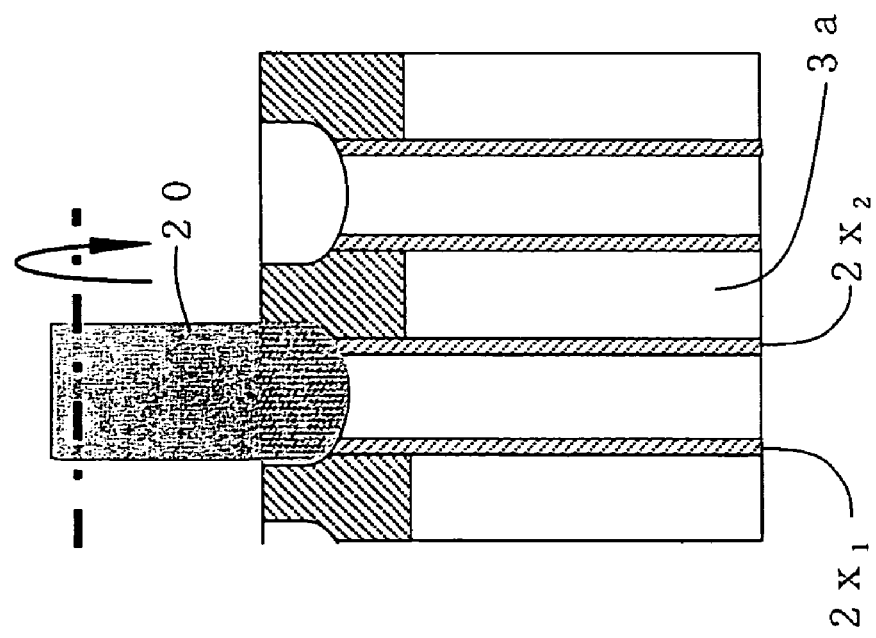
FIG. 12(a) is a partial enlarged view of an A-A section of FIG. 11(b)
Figure 13:
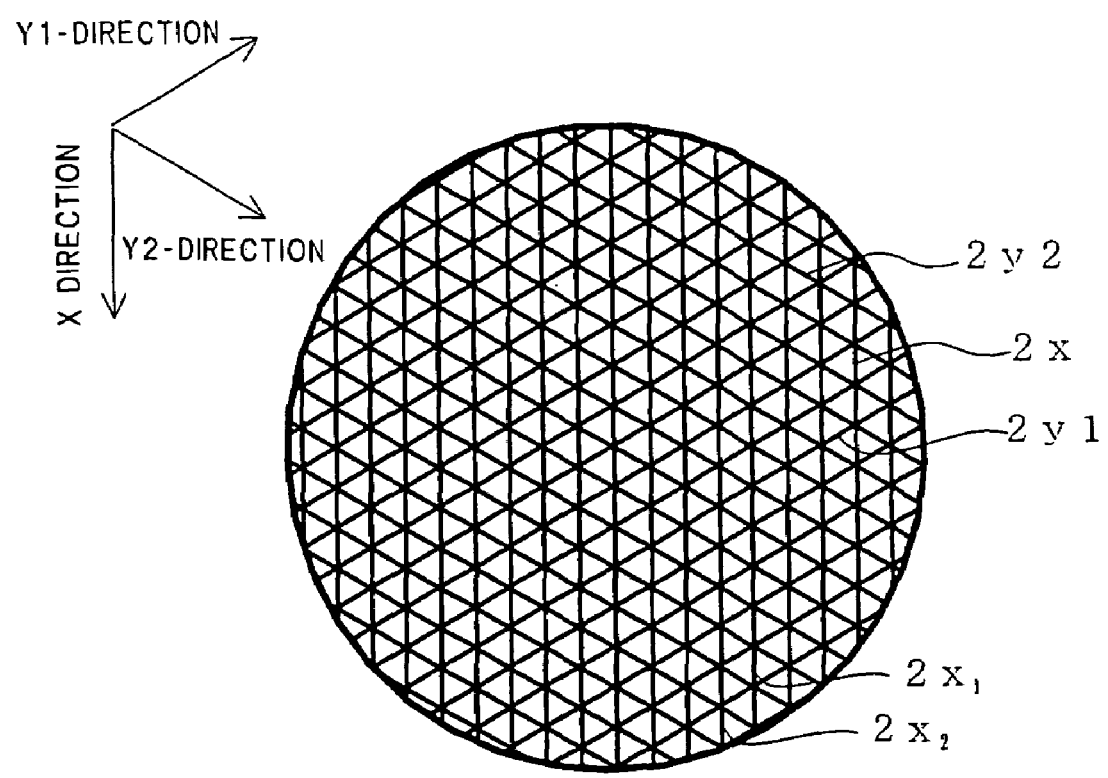
FIG. 13 is a plan view showing another mode of the honeycomb structure according to the present invention.

Next, the concrete embodiment of the manufacturing method of a fourth aspect will be described. As shown in FIGS. 11(a), (b) and 12(a), (b), for important characteristics, the manufacturing method of the fourth aspect includes a step of processing/removing two adjacent partition walls $2x_1$, $2x_2$ among a plurality of partition walls $2x$ arranged substantially in parallel with the X-direction and the plugging portion 4 between the partition walls along the longitudinal direction of the partition walls $2x_1$, $2x_2$, that is, the X-direction in the one-end portion 42 of the honeycomb body 10 comprising the plurality of partition walls $2x$ arranged substantially in parallel with the X-direction and a plurality of partition walls $2y$ arranged substantially in parallel with the Y-direction so as to form a plurality of cells 3 extending to the other-end portion 44 from the one-end portion 42 through the axial direction, and the plugging portions 4 for plugging the open end portions 40 of the predetermined cells among the plurality of cells 3 in either of the end portions 42 and 44. By this step, it is possible to easily manufacture the honeycomb structure 1 of the second aspect shown in FIGS. 3(a), (b) and 4(a), (b) in the mass-producible method. The cell of the honeycomb body is not limited to the quadrangular cell. For example, with the triangular cell, as shown in FIG. 13, two adjacent partition walls $2x_1$, $2x_2$ among the plurality of partition walls $2x$ arranged substantially in parallel with the X-direction and the plugging portion 4 disposed between the two partition walls can be processed/removed along the longitudinal direction of the partition walls $2x_1$, $2x_2$, that is, the X-direction.

The processing/removing can be performed in a method similar to that of the third aspect. In the fourth aspect, the honeycomb body is preferably cut broader on an end portion side than on an inner side of the axial direction of the honeycomb body, that is, the processing/removing is preferably performed so as to make a U-shaped or inverse trapezoidal groove. By the processing/removing, as shown in FIGS. 4(a) and 5, the protruding portion can be formed in a shape thinned at the tip, and the open end portion can be further prevented from being easily blocked. Furthermore, the partition wall is also obliquely surrounded and removed together with the plugging portion, and the thickness of the partition wall is reduced toward the tip in a preferably shape.

In the fourth aspect, after the processing/removing in the X-direction, two adjacent partition walls and the plugging portion between the walls are processed/removed along the longitudinal direction of the partition walls arranged in parallel with the Y-direction in the same end portion. This is preferable in that the plugging portion including the protruding portion protruding from any other surrounding partition wall can be prepared. Moreover, also in the other-end portion, the processing/removing is preferably performed along the longitudinal direction of the predetermined partition wall in the same manner as described above. This can realize the honeycomb structure which is superior in the resistance to the thermal shock and small in pressure loss even in the other-end portion. It is to be noted that for the quadrangular cell, one example of the shape of the protruding portion 5 of the convex plugging portion formed in the processing/removing only in the X-direction is shown in FIG. 8(a). One example of the shape of the protruding portion 5 of the convex plugging portion formed in the processing/removing in the X and Y-directions is shown in FIG. 8(b). For the triangular cell, one example of the shape of the protruding portion 5 of the convex plugging portion formed in the processing/removing only in the X-direction is shown in FIG. 8(c).

Figure 14B:
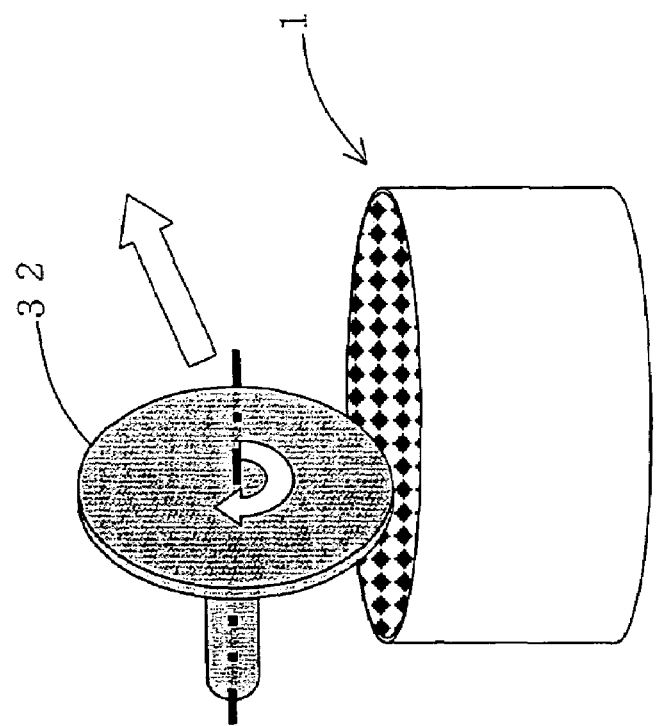
FIGS. 14(a), (b) are explanatory views showing another mode of the method of manufacturing the honeycomb structure according to the present invention.
Figure 14A:
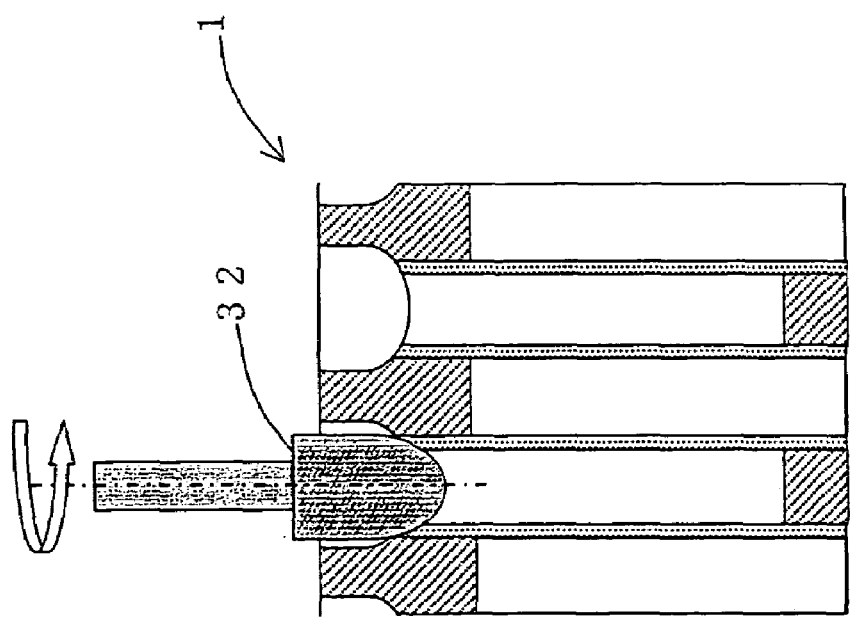

In the third and fourth aspects, for the honeycomb body, for example, a powder of at least one material selected from the examples of the materials which are preferable main components in the first and second aspects is used as a raw material, and binders such as methyl cellulose and hydroxypropoxyl methyl cellulose are added to the material, and a surfactant and water are further added to form a plastic clay. A pore former or dispersant may further be added to the clay. The pore former is not limited as long as the material gas a property of disappearing by a firing step. Inorganic materials such as a carbon material, high polymer compounds such as a plastic material, organic materials such as starch and the like may also be used alone or as a combination of two or more of the materials. After extruding/forming the clay to form a formed body having a honeycomb shape, the body is fired to form a fired body so that the honeycomb body can be prepared. For the plugging portion of the fourth aspect, the above-described powder raw material is used as a slurry in the same manner as described above, charged into the predetermined cell of the formed or fired body, and then fired so that the portion can be formed. The fired body formed in this manner is also preferably subjected to the processing/removing step in the third or fourth aspect, and the non-fired formed body may also be subjected to the processing/removing step. As shown in FIGS. 14(a), (b), after the processing/removing, the surface is finished by a buff grinding tool 32 like a felt buff or the like, and this is preferable in that the fluid to be treated smoothly flows.

Moreover, as means for reducing the porosity of the plugging portion, there is a method in which a slurry component of a plugging agent is prepared and fired beforehand so as to set the porosity of the plugging portion to be smaller than that of a honeycomb structure main body. The protruding portion may also be coated with components such as cordierite, silica, and alumina. A Ti-based or W-based hard material may also be sprayed onto the protruding portion surface. When the protruding portion is coated in this manner, the porosity only of the protruding portion can be reduced.

Figure 15:
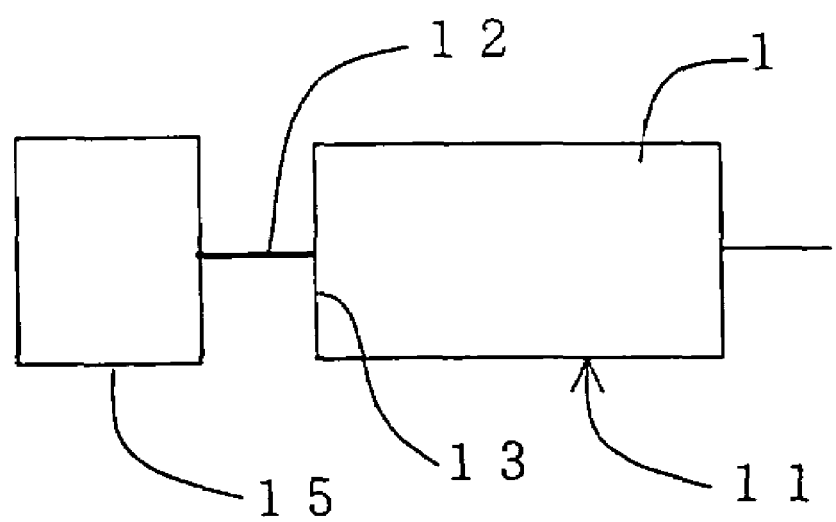
FIG. 15 is a schematic diagram showing one mode of a discharge fluid purification system according to a fifth aspect of the present invention.

Next, the discharge fluid purification system of a fifth aspect will be described. As shown in FIG. 15, the purification system of the fifth aspect comprises: a purification section 11 for purifying a discharge fluid; and an introductory section 12 such as an exhaust tube for introducing the discharge fluid discharged, for example, from an internal combustion engine 15 or the like into the purification section 11. Moreover, the purification section 11 comprises the honeycomb structure 1 of the first and/or second aspect. The honeycomb structure is disposed in such a manner that the one-end portion having the height difference in the end portion is disposed on an upstream side 13 of the discharge fluid, that is, on an inlet side on which the discharge fluid flows in the honeycomb structure. This arrangement can effectively inhibit the blocking.

EXAMPLES

The present invention will be described hereinafter in more detail based on examples, but the present invention is not limited to these examples.

(Preparation of Honeycomb Body)

First, a foaming resin was added as the pore former to silica, kaolin, talc, and alumina which were cordierite raw materials, further the binder, dispersant, and water were added, and the materials were kneaded to form a clay. The obtained clay was extruded/formed by the use of a die for extruding/forming the honeycomb structure having a predetermined shape to form the honeycomb formed body. Next, the obtained honeycomb formed body was dried by a combination of microwave or dielectric drying and hot air drying, and the dried honeycomb formed body was cut into predetermined shapes. A polyester film was attached to the end surface of the honeycomb formed body cut in the predetermined shape, and holes were made in the polyester film by an NC scannable laser device so that the cell in the end surface of the honeycomb formed body opens in a zigzag shape.

Thereafter, water, binder, glycerin were added separately to the cordierite raw material to prepare a slurry of about 200 dPa·S, the slurry was brought in a container for plugging, and the honeycomb formed body to which the film including holes made in a zigzag form was attached was pressed into this container for plugging. Accordingly, the cells of the honeycomb formed body were plugged in the zigzag form. Hot air at about 160° C. was applied to the plugged portions of the respective end surfaces of the honeycomb formed body obtained in this manner to dry the body for about five minutes. Thereafter, the honeycomb formed body was fired to prepare honeycomb bodies A and B.

For the prepared honeycomb body A, a diameter of the end surface was about 229 mm, a length of the axial direction was about 150 mm, the cell had a square shape, and the partition wall thickness was about 0.4 mm. Moreover, a cell pitch was set to about 2.5 mm. This is commonly known as a cell structure 17 mil/100 cpsi. Here, 1 mil=$\frac{1}{1000}$ inch, 100 cpsi=100 cells/square inch. A plugging length in a cell passage inner direction from the end surface was about 10 mm on the one-end surface side, and about 3 mm on the other-end surface side. The porosity of the partition wall of the obtained honeycomb structure was measured by a mercury porosimeter as 67%, and an average pore diameter was 21 μm.

For the honeycomb body B, the diameter of the end surface was about 144 mm, the length of the axial direction was about 152 mm, the cell had a square shape, and the partition wall thickness was about 0.3 mm. Moreover, the cell pitch was set to about 1.5 mm. This is commonly known as a cell structure 12 mil/300 cpsi. The plugging length in the cell passage inner direction from the end surface was about 10 mm in either end surface, Example 1 and Comparative Example 1

For the honeycomb body A prepared in this manner, the grindstone was rotated and sent along the longitudinal direction of the partition wall, and two adjacent partition walls and the plugging portion between the partition walls were processed/removed so as to process/form a plurality of grooves in the end portion of the honeycomb body. The convex and concave plugging portions were formed, and the honeycomb structure of Example 1 was obtained. The grooves were processed and formed in both the X and Y-directions. A grindstone width was 4.0 mm, a depth of the groove was 5.0 mm, and the tip of the grindstone was rounded by about R 1 mm. For the grindstone, a #200 electrodeposition diamond grindstone was used, and the processing was performed by an NC control plane grinding machine. The honeycomb body which was not subjected to the processing/removing was used as the honeycomb structure of Comparative Example 1.

Figure 16:
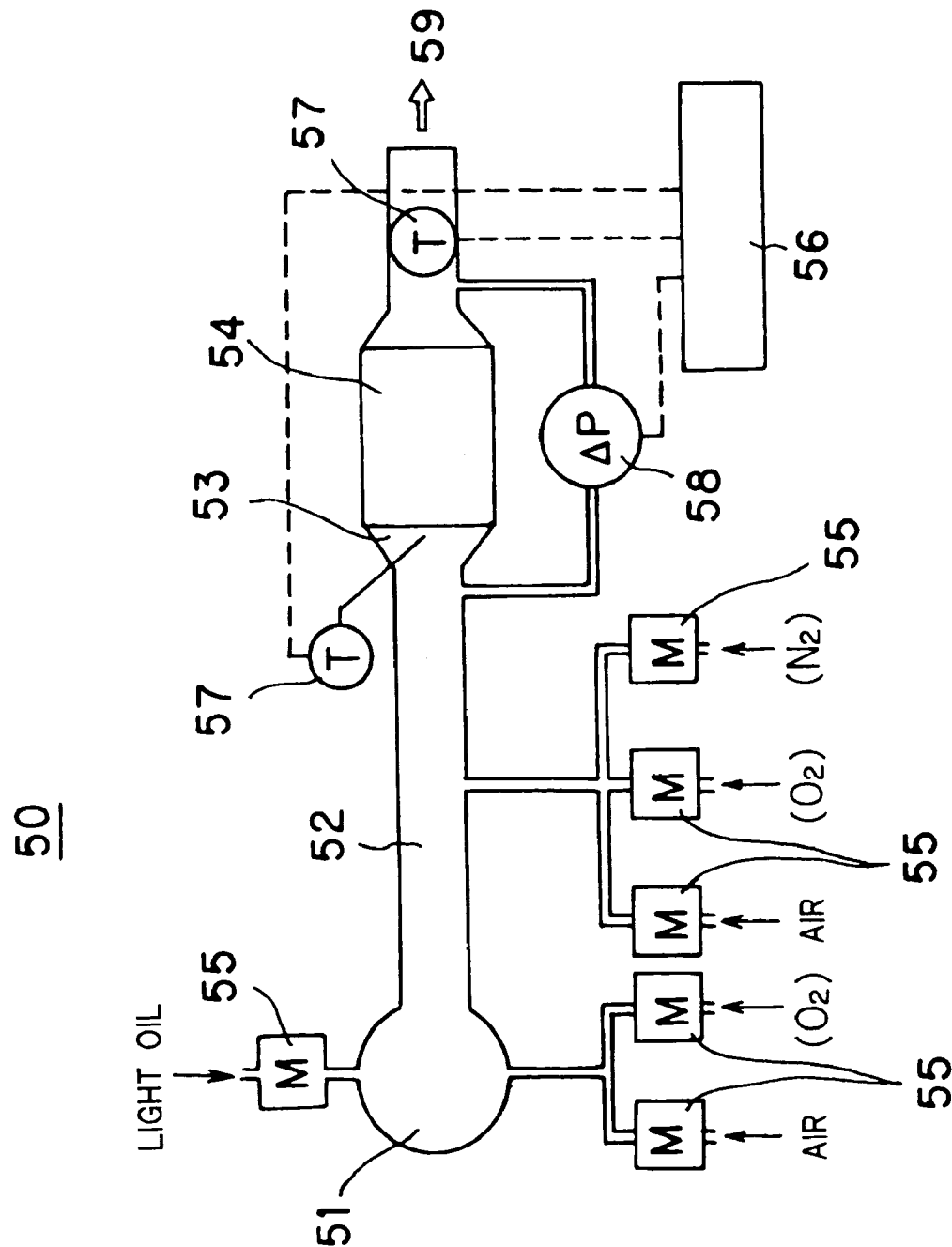
FIG. 16 is an outline constitution diagram of a soot generator for use in an embodiment of the present invention.

The obtained honeycomb structures (Example 1 and Comparative Example 1) were subjected to a particulate material deposition test by the use of a soot generator, and the pressure losses of the honeycomb structures (example and comparative example) by the deposited particulate materials were measured. As shown in FIG. 16, a soot generator 50 includes: a combustion chamber 51 capable of generating a large amount of particulate materials by combustion of a light oil in the generator; a passage channel 52 through which combustion gas and particulate materials generated in the combustion chamber 51 passed; and a test chamber 53 which communicates with the passage channel 52 and in which a honeycomb structure 54 is disposed and which is capable of depositing a large amount of particulate materials in the honeycomb structure 54 in a short time.

Flow rate meters 55 are disposed in the combustion chamber 51 so that the fuel is supplied, and air or oxygen if necessary can be supplied. The passage channel 52 is provided with the flow rate meter 55 so that air or oxygen and nitrogen if necessary can be supplied. In the test chamber 53, a thermocouple 57 for temperature measurement, connected to a recorder 56, and a pressure gauge 58 for measuring an internal pressure of the test chamber 53 are disposed. The test chamber 53 is connected to an exhaust duct 59 from which a gas flowing through the honeycomb structure 54 from the passage channel 52 is discharged. The temperature of the test chamber 53 at the time of trapping the particulate material was at about 200° C., and an air flow rate was 9 Nm$^3$/min. In this case, a particulate material generated amount was 90 g per hour. Deposited situations of the particulate materials in the end surfaces of the honeycomb structures 54 of Example 1 and Comparative Example 1 were confirmed.

Figure 7A:
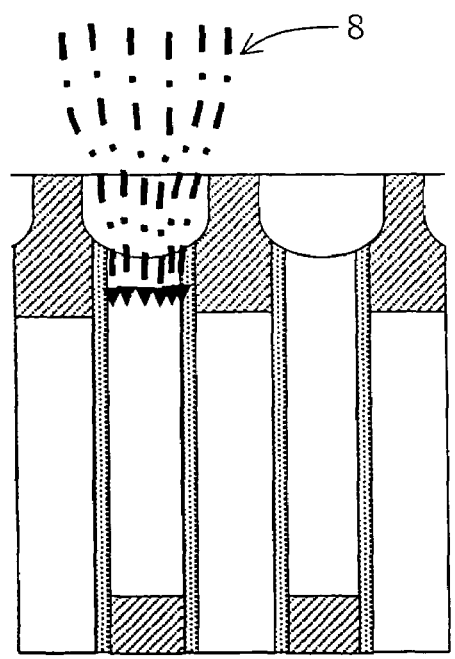
FIGS. 7(a) to (c) are explanatory views showing a process in which a particulate material flows in and is deposited on the honeycomb structure shown in FIG. 4(a)
Figure 7B:
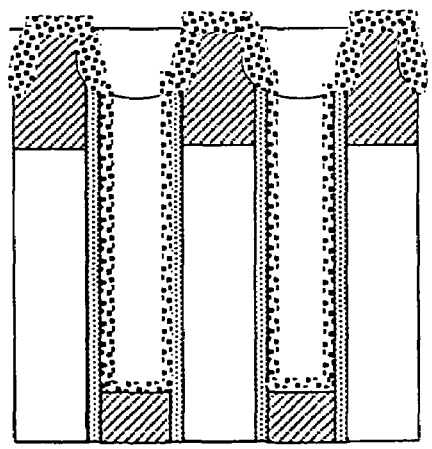
Figure 7C:
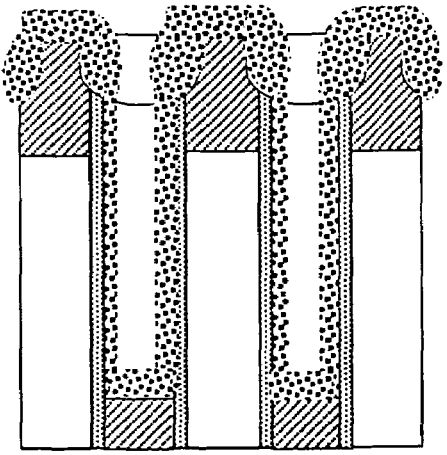

The deposited situations of the particulate materials in the end surfaces of the honeycomb structures of Example 1 and Comparative Example 1 were confirmed. As shown in FIG. 7(b), in the honeycomb structure of the example, the deposition/pool of the particulate material in the inlet of the cell proceeded, and the inlet of the cell was narrowed. For the honeycomb structure of the example, since the opening area of the inlet of the cell was comparatively broad, the particulate materials entered the cell. Thereafter, even when the particulate materials were further deposited, as shown in FIG. 7(c), the inlet of the cell was not blocked, because the opening area of the inlet of the cell was broad. The concave/convex portions are formed in the inlet end surface of the honeycomb structure, and therefore the area of the end surface on which the PM is deposited increases. This is also supposed to contribute to the reduction of a PM deposition thickness. From this, the pressure loss of the honeycomb structure of Example 1 did not rapidly increase.

Moreover, as shown in FIG. 21(b), for the honeycomb structure of the comparative example, the deposition/pool of the particulate material in the inlet of the cell proceeded, and the inlet of the cell was narrowed. Thereafter, when the particulate materials were further deposited, as shown in FIG. 21(c), the inlet portion of the cell was blocked, and the pressure loss rapidly rose. In an initial stage of the PM deposition, the pressure loss of Example 1 was compared with that of Comparative Example 1 in a state in which a difference did not appear in the PM deposited state, and as a result, the loss of Example 1 was lower than that of Comparative Example 1 by about 7%.

Examples 2, 3 and Comparative Example 2

Figure 17A:
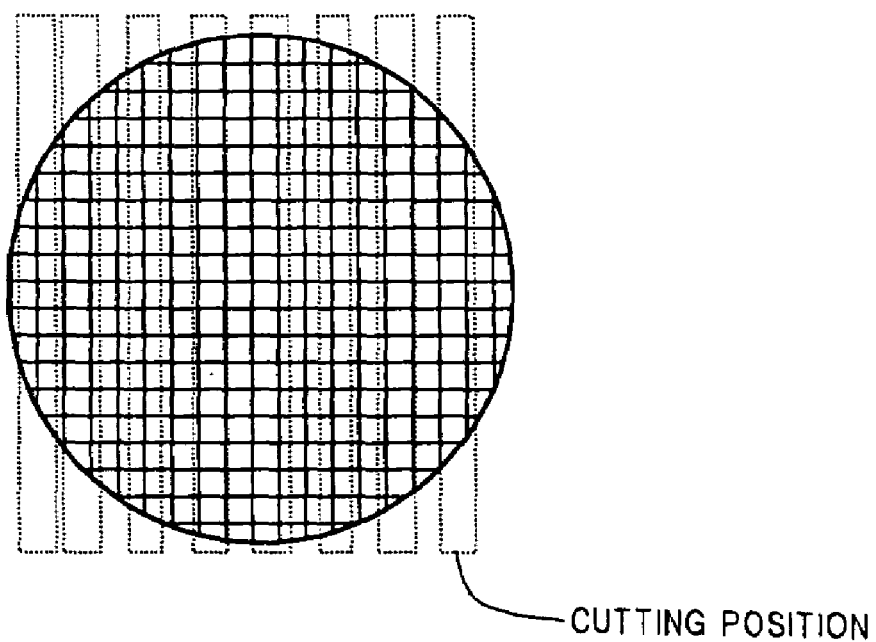
FIGS. 17(a), (b) are explanatory views showing a manufacturing method of the embodiment.
Figure 17B:
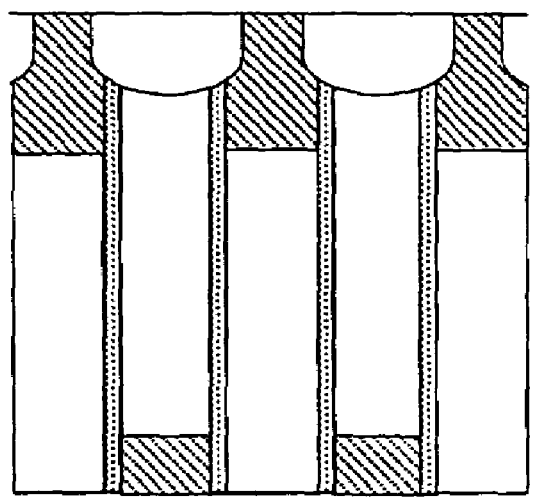

For the honeycomb body B, predetermined positions of the end portion were processed/removed so as to form the grooves and the convex and concave plugging portions were prepared in the same manner as in Example 1 except that the end surface on the inlet side of the fluid to be treated in the one-end portion was processed/removed only in the X-direction as shown in FIGS. 17(a), (b), and the pressure loss of the filter at a time when only air was passed on a condition that the PM was not deposited was measured (Example 2). For the honeycomb structure used in Example 2, the inlet side of the fluid to be treated and the outlet side were reversed, that is, the convex and concave plugging portions were arranged on a downstream side, and the pressure loss was measured in the same manner as in Example 2 (Example 3). The honeycomb body B was used as a sample of Comparative Example 2, and the pressure loss was measured in the same manner as in Example 2. Results are shown in FIG. 18.

Figure 18:
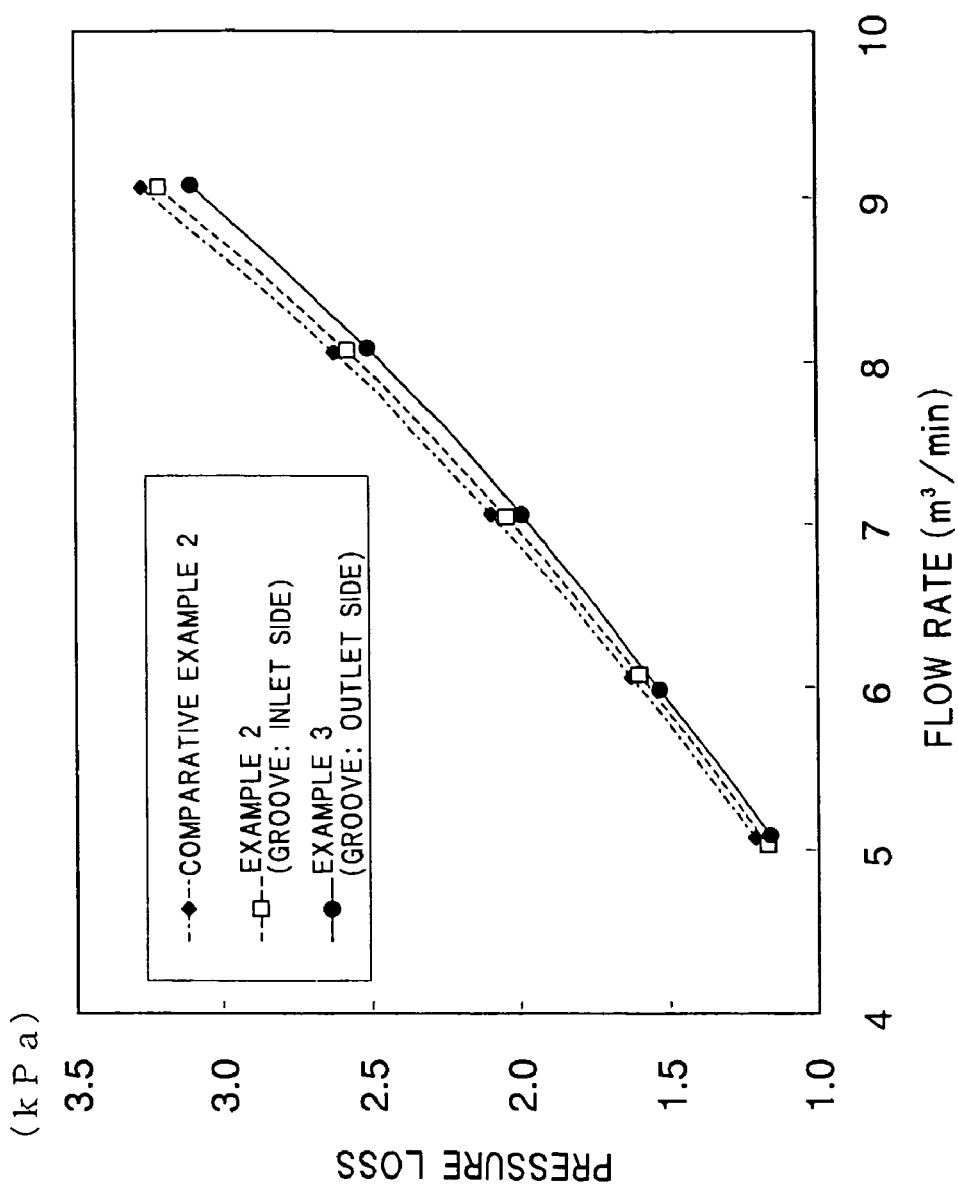
FIG. 18 is a graph showing a result of the embodiment.
Figure 19A:
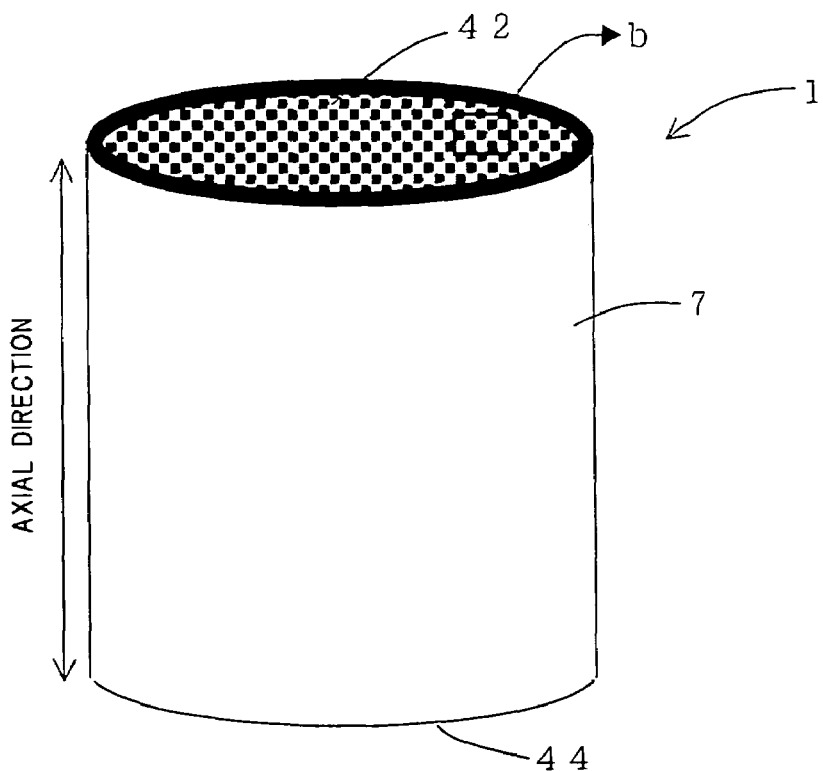
FIG. 19(a) is a schematic perspective view showing one example of a conventional honeycomb structure, (b) is a plane partial enlarged view, and (c) is a section partial enlarged view.
Figure 19B:
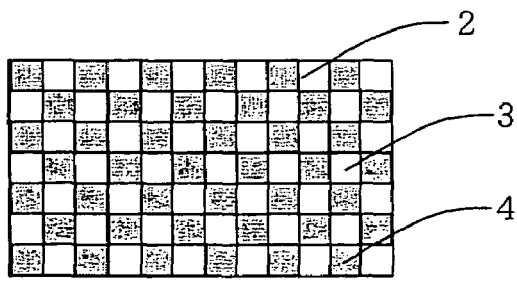
Figure 19C:
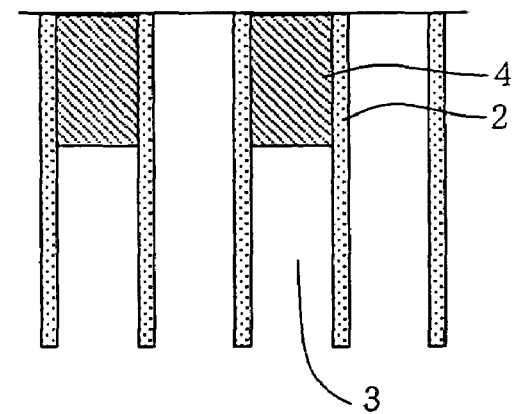

From FIG. 18, it has been confirmed that the pressure losses of the samples of Examples 2, 3 drop as compared with the sample of Comparative Example 2. In Example 3, it has been confirmed that the pressure loss further drops.

As described above, for honeycomb structures of first and second aspects of the present invention, and a discharge fluid purification system of a fifth aspect in which the honeycomb structure is used, an opening at a use time is inhibited from being blocked, and a pressure loss is inhibited from increasing. Therefore, the structure and system are preferably usable, for example, for trapping particulates in an exhaust gas of an internal combustion engine, boiler or the like or as a filter for filtering liquids such as city water and sewage and as a purification system. Moreover, methods of manufacturing the honeycomb structures of the third and fourth aspects are preferably usable as methods of manufacturing the honeycomb structures because the honeycomb structures of the first and second aspects can easily be manufactured and mass production is possible.

What is claimed is:

1. A honeycomb structure comprising: partition walls arranged so as to form a plurality of cells extending to an other-end portion from a one-end portion through an axial direction, wherein the partition walls having different heights in the axial direction are arranged in the one-end portion, the partition wall including a portion whose thickness is reduced toward a tip in the end portion.

2. The honeycomb structure according to claim 1, comprising:
a plurality of partition walls arranged in parallel with an X-direction in a section vertical to the axial direction of the honeycomb structure,
wherein the plurality of partition walls include a partition wall disposed in such a manner that the height of the partition wall in the axial direction is different from the heights of adjacent partition walls on opposite sides in the one-end portion.

3. The honeycomb structure according to claim 2, further comprising:
a plurality of partition walls arranged in parallel with a Y-direction in a section vertical to the axial direction of the honeycomb structure, wherein the plurality of partition walls include a partition wall disposed in such a manner that the height of the partition wall in the axial direction is different from the heights of adjacent partition walls on opposite sides in the one-end portion.

4. The honeycomb structure according to claim 1, comprising: partition walls having different heights in the axial direction in the other-end portion.

5. A honeycomb structure comprising: a plurality of partition walls arranged in parallel with an X-direction and a plurality of partition walls arranged in parallel with a Y-direction so as to form a plurality of cells extending to an other-end portion from a one-end portion through an axial direction; and plugging portions for plugging open end portions of predetermined cells among the plurality of cells in either end portion, wherein the plugging portions in the one-end portion comprise a convex plugging portion including a protruding portion protruding from any of surrounding partition walls in the axial direction, and a concave plugging portion dented from the convex plugging portion in the axial direction, and intersecting portions of surrounding partition walls of one cell which does not include any plugging portion contact one or more cells including the convex plugging portions and one or more cells including the concave plugging portion for each intersecting portion in the one-end portion.

6. The honeycomb structure according to claim 5, wherein the plugging portion comprises a protruding portion protruding from any of the surrounding partition walls in the axial direction.

7. The honeycomb structure according to claim 5, wherein the protruding portion of the convex plugging portion comprises a portion whose width is reduced toward a tip from a cell side.

8. The honeycomb structure according to claim 5, wherein a catalyst component is carried by the surface of the plugging portion.

9. The honeycomb structure according to claim 5, wherein the plugging portion comprises a convex plugging portion including a protruding portion protruding from any of the surrounding partition walls in the axial direction, and a concave plugging portion dented from the convex plugging portion in the axial direction in the other-end portion.

10. The honeycomb structure according to claim 5, wherein any of the surrounding partition walls of one cell which does not include any plugging portion comprises a portion whose thickness is reduced toward a tip so as to enlarge an opening of the cell in the one-end portion.

11. The honeycomb structure according to claim 10, wherein the convex plugging portion is disposed in contact with the portion of the partition wall whose thickness is reduced toward the tip.

12. The honeycomb structure according to claim 1, wherein the partition wall comprises pores and is porous, and the surface of the partition wall and/or the pore surface inside the partition wall carries a catalyst component.

13. A discharge fluid purification system comprising:
a purification section for purifying a discharge fluid; and
an introductory section for introducing the discharge fluid into the purification section,
wherein the purification section comprises a honeycomb structure comprising partition walls arranged so as to form a plurality of cells extending to an other-end portion from a one-end portion through an axial direction,
wherein the partition walls having different heights in the axial direction are arranged in the one-end portion, and a one-end portion of the honeycomb structure is disposed on an upstream side, and
wherein the partition wall includes a portion whose thickness is reduced toward a tip in the end portion.

14. A discharge fluid purification system comprising: a purification section for purifying a discharge fluid; and an introductory section for introducing the discharge fluid into the purification section,
wherein the purification section comprises a honeycomb structure comprising a plurality of partition walls arranged in parallel with an X-direction and a plurality of partition walls arranged in parallel with a Y-direction so as to form a plurality of cells extending to an other-end portion from a one-end portion through an axial direction; and plugging portions for plugging open end portions of predetermined cells among the plurality of cells in either end portion, wherein the plugging portions in the one-end portion comprise a convex plugging portion including a protruding portion protruding from any of surrounding partition walls in the axial direction, and a concave plugging portion dented from the convex plugging portion in the axial direction, and intersecting portions of surrounding partition walls of one cell which does not include any plugging portion contact one or more cells including the convex plugging portions and one or more cells including the concave plugging portion for each intersecting portion in the one-end portion, and a one-end portion of the honeycomb structure is disposed on an upstream side.

15. A method of manufacturing a honeycomb structure, the method comprising:
processing/removing a partition wall along a longitudinal direction of the partition wall in a one-end portion of a honeycomb body comprising partition walls arranged so as to form a plurality of cells extending to an other-end portion from the one-end portion through an axial direction, the partition wall including a portion whose thickness is reduced toward a tip in the end portion.

16. The method of manufacturing the honeycomb structure according to claim 15, comprising: a step of processing/removing the plurality of partition walls every other partition wall along the longitudinal direction of the partition wall in the one-end portion of the honeycomb body comprising the plurality of partition walls arranged in parallel with an X-direction in a section vertical to the axial direction.

17. The method of manufacturing the honeycomb structure according to claim 16, comprising: a step of processing/removing the plurality of partition walls every other partition wall along the longitudinal direction of the partition wall in the one-end portion of the honeycomb body further comprising the partition walls arranged in parallel with a Y-direction in a section vertical to the axial direction.

18. The method of manufacturing the honeycomb structure according to claim 15, comprising: a step of processing/removing the partition walls along the longitudinal direction of the partition wall in the other-end portion.

19. A method of manufacturing a honeycomb structure comprising: a step of processing/removing two adjacent partition walls among a plurality of partition walls arranged in parallel with an X-direction and a plugging portion between the partition walls along a longitudinal direction of the partition wall in a one-end portion of a honeycomb body comprising the plurality of partition walls arranged in parallel with the X-direction and a plurality of partition walls arranged in parallel with a Y-direction so as to form a plurality of cells extending to an other-end portion from a one-end portion through an axial direction, and plugging portions for plugging open end portions of predetermined cells among the plurality of cells in either end portion.

20. The method of manufacturing the honeycomb structure according to claim 16, further comprising: a step of processing/removing two adjacent partition walls among the plurality of partition walls arranged in parallel with the Y-direction and a plugging portion between the partition walls along the longitudinal direction of the partition wall in the one-end portion of the honeycomb body.

21. The method of manufacturing the honeycomb structure according to claim 19, wherein the processing/removing step comprises: a step of processing/removing the honeycomb body broader on an end portion side than on an inner side of the axial direction of the honeycomb body.

22. The method of manufacturing the honeycomb structure according to claim 19, comprising: a step of processing/removing two adjacent partition walls among the plurality of partition walls arranged in parallel with the X or Y-direction and the plugging portion between the partition walls along the longitudinal direction of the partition wall in the other-end portion.

23. The method of manufacturing the honeycomb structure according to claim 15, wherein the honeycomb body is a fired body.

24. The method of manufacturing the honeycomb structure according to claim 15, wherein the honeycomb body is a non-fired body, and a firing step is performed after the processing/removing step.

* * * * *